(12) United States Patent
Tamp

(10) Patent No.: US 11,273,709 B2
(45) Date of Patent: *Mar. 15, 2022

(54) IN-VEHICLE SHARED-SCREEN SYSTEM WITH WRITE BACK TO MULTIPLE USER ACCOUNTS

(71) Applicant: Google Inc., Mountain View, CA (US)

(72) Inventor: Fabian John Tamp, Stanmore (AU)

(73) Assignee: GOOGLE LLC, Mountain View, CA (US)

( * ) Notice: Subject to any disclaimer, the term of this patent is extended or adjusted under 35 U.S.C. 154(b) by 884 days.

This patent is subject to a terminal disclaimer.

(21) Appl. No.: 15/382,260

(22) Filed: Dec. 16, 2016

(65) Prior Publication Data

US 2017/0099279 A1    Apr. 6, 2017

Related U.S. Application Data

(63) Continuation of application No. 14/721,756, filed on May 26, 2015, now Pat. No. 9,608,976.

(51) Int. Cl.
*H04L 29/06* (2006.01)
*B60K 35/00* (2006.01)
(Continued)

(52) U.S. Cl.
CPC .............. *B60K 35/00* (2013.01); *B60K 37/06* (2013.01); *G06F 21/30* (2013.01);
(Continued)

(58) Field of Classification Search
CPC ....... H04L 63/08; H04L 63/102; H04L 63/10; G06F 21/6218; H04W 12/06
(Continued)

(56) References Cited

U.S. PATENT DOCUMENTS

| 9,608,976 B2 * | 3/2017 | Tamp ..................... B60K 35/00 |
| 2003/0139192 A1 * | 7/2003 | Chmaytelli ......... H04M 15/765 |
| | | 455/463 |

(Continued)

FOREIGN PATENT DOCUMENTS

| CN | 101067880 A | 11/2007 |
| CN | 104050991 A | 9/2014 |

(Continued)

OTHER PUBLICATIONS

"iOS Security—White Paper", Apple Inc., Oct. 2014 (54 pgs.).

(Continued)

*Primary Examiner* — Evans Desrosiers
(74) *Attorney, Agent, or Firm* — Shumaker & Sieffert, P.A.

(57) ABSTRACT

In some examples, a vehicle head unit of a vehicle includes at least one processor; and at least one module operable to: responsive to authenticating a first user at a vehicle head unit of a vehicle, establish a session with a first user identifier, the first user identifier associated with the first user; responsive to authenticating a second user at the vehicle head unit, associate a second user identifier with the session, the second user identifier associated with the second user, wherein the first and second user identifiers are concurrently associated with the session; generate data while the first and second user identifiers are concurrently associated with the session; and store, based on the first user identifier and the second user identifier, the data to both a first user account associated with the first user identifier and a second user account associated with the second user identifier.

20 Claims, 6 Drawing Sheets

(51) Int. Cl.
| | |
|---|---|
| H04L 67/141 | (2022.01) |
| G06F 21/30 | (2013.01) |
| G06F 21/62 | (2013.01) |
| H04L 67/146 | (2022.01) |
| H04W 4/48 | (2018.01) |
| H04W 4/44 | (2018.01) |
| B60K 37/06 | (2006.01) |
| H04W 12/069 | (2021.01) |
| H04L 67/12 | (2022.01) |

(52) U.S. Cl.
CPC .......... *G06F 21/6245* (2013.01); *H04L 63/08* (2013.01); *H04L 63/102* (2013.01); *H04L 67/12* (2013.01); *H04L 67/141* (2013.01); *H04L 67/146* (2013.01); *H04W 4/44* (2018.02); *H04W 4/48* (2018.02); *H04W 12/069* (2021.01); *B60K 2370/1438* (2019.05); *B60K 2370/52* (2019.05); *B60K 2370/55* (2019.05); *B60K 2370/563* (2019.05); *B60K 2370/589* (2019.05); *B60K 2370/73* (2019.05); *B60K 2370/736* (2019.05); *B60K 2370/739* (2019.05); *B60K 2370/741* (2019.05); *G06F 2221/2103* (2013.01)

(58) Field of Classification Search
USPC .......................................................... 726/4
See application file for complete search history.

(56) References Cited

U.S. PATENT DOCUMENTS

| | | | |
|---|---|---|---|
| 2004/0003073 | A1 | 1/2004 | Krzyzanowski et al. |
| 2010/0222939 | A1* | 9/2010 | Namburu ................ G07C 9/28 701/2 |
| 2013/0160141 | A1* | 6/2013 | Tseng ...................... G06F 21/31 726/28 |
| 2014/0068713 | A1 | 3/2014 | Nicholson et al. |
| 2014/0163771 | A1 | 6/2014 | Demeniuk |
| 2014/0163774 | A1* | 6/2014 | Demeniuk .............. H04L 67/12 701/2 |
| 2014/0309866 | A1 | 10/2014 | Ricci |
| 2015/0081169 | A1 | 3/2015 | Pisz |
| 2016/0352712 | A1 | 12/2016 | Tamp |

FOREIGN PATENT DOCUMENTS

| | | | | |
|---|---|---|---|---|
| JP | 2006-092371 | A | 4/2006 | |
| JP | 2009140051 | A * | 6/2009 | ............ G06F 17/30 |
| JP | 2009-244078 | A | 10/2009 | |
| JP | 2013246507 | A * | 12/2013 | ............ G06Q 30/06 |
| JP | 2015-002425 | A | 1/2015 | |
| JP | 2015074315 | A * | 4/2015 | ............ B60R 16/02 |
| JP | 2015111131 | A * | 6/2015 | ........ G01R 19/2513 |
| WO | WO-2009147711 | A1 * | 12/2009 | ......... G01C 21/3617 |

OTHER PUBLICATIONS

Horsey,"Netflix Announces Multiple User Profiles on Single Account is Now Possible", Geeky Gadgets [online]. Retrieved from the Internet: http://www.geeky-gadgets.com/netflix-announces-multiple-users-profiles-on-single-account-is-now-possible-12-06-2013/ Jun. 12, 2013 (6 pgs.).
Prosecution History from U.S. Appl. No. 14/721,756, dated Aug. 19, 2016 through Dec. 13, 2016, 34 pp.
The Notice of Acceptance for Patent Application, from counterpart Australian Application No. 2016266750, dated Jul. 17, 2017, 7 pp.
International Search Report and Written Opinion of International Application No. PCT/US2016/030858, dated Jul. 20, 2016, 13 pp.
"Specification of the Bluetooth System", Version 4.2 [vol. 0], Retrieved from the Internet: <https://www.bluetooth.org/DocMan/handlers/DownloadDoc.ashx?doc_id=286439>, Dec. 2, 2014, 2772 pp.
International Preliminary Report on Patentability from International Application No. PCT/US2016/030858, dated Dec. 7, 2017, 8 pp.
Examiner's Report from counterpart Canadian Application No. 2,953,587, dated Oct. 26, 2017, 3 pp.
Response to Canadian Examiner's Report dated Oct. 26, 2017, from counterpart Canadian application No. 2,953,587, filed Apr. 20, 2018, 21 pp.
Examination Report from counterpart European Application No. 16722506.9, dated Dec. 12, 2018, 4 pp.
Notice of Allowance from counterpart Canadian Application No. 2,953,587, dated Jul. 5, 2018, 1 pp.
Response to Communication pursuant to Rules 161(1) and 162 dated Jan. 8, 2018, from counterpad European Application No. 16722506.9, filed Jul. 3, 2018, 15 pp.
The Notification of First Office Action, and translation thereof, from counterpad Chinese Application No. 201680001920.2, dated Sep. 19, 2018, 21 pp.
The Notification of Reason for Rejection, and translation thereof, from counterpart Japanese Application No. 2016-575385, dated Aug. 28, 2018, 13 pp.
The Notice of Office Action, and translation thereof, from counterpart Korean Application No. 10-2016-7037103, dated Sep. 28, 2018, 10 pp.
Second Office Action and Search Report, and translation thereof, from counterpart Chinese Application No. 201680001920.2, dated Feb. 12, 2019, 8 pp.
Final Decision for Rejection, and translation thereof, from counterpart Japanese Application No. 2016575385, dated Feb. 12, 2019, 5 pp.
Response to Examination Report dated Dec. 12, 2018 from counterpart European Application No. 16722506.9, filed Mar. 25, 2019, 10 pp.
Notification for Patent Registration Formalities and translation thereof, from counterpart Chinese Application No. 201680001920.2, dated Apr. 25, 2019, 8 pp.
Notice of Intent to Grant and Text Intended to Grant from counterpart European Application No. 16722506.9, dated Aug. 23, 2019, 53 pp.
Examination Report from counterpart European Application No. 19204478.2, dated Dec. 4, 2020, 5 pp.
Response to Examination Report dated Dec. 4, 2020, from counterpart European Application No. 19204478.2, filed Mar. 15, 2021, 3 pp.
Extended Search Report from counterpart European Application No. 19204478.2, dated Jan. 24, 2020, 8 pp.
Response to Extended Search Report dated Jan. 24, 2020, from counterpart European Application No. 19204478.2, filed Aug. 4, 2020,16 pp.
First Examination Report, and translation thereof, from counterpart Indian Patent Application No. 201647044425, dated May 28, 2020, 7 pp.
Response to First Examination Report dated May 28, 2020, from counterpart Indian Application No. 201647044425, filed Sep. 2, 2020, 13 pp.
Pre-Appeal Re-Examination Report, and translation thereof, from counterpart Japanese Application No. 2016-575385, dated Jul. 10, 2019, 7 pp.
Reconsideration Report by Examiner Before Appeal, and translation thereof, from counterpart Japanese Application No. 2016-575385, dated Jul. 10, 2019, 7 pp.
The Notice of Reasons for Refusal, and translation thereof, from counterpart Japanese Application No. 2016-575385, dated Jun. 3, 2020, 23 pp.
First Office Action and Search Report, and translation thereof, from counterpart Chinese Application No. 201910510231.X dated Jan. 4, 2022, 11 pp.

\* cited by examiner

IN-VEHICLE SHARED-SCREEN SYSTEM WITH WRITE BACK TO MULTIPLE USER ACCOUNTS

RELATED APPLICATION

This application is a continuation of U.S. application Ser. No. 14/721,756, filed May 26, 2015, the entire content of which is incorporated herein by reference.

BACKGROUND

Vehicles, such as automobiles, motorcycles, aircraft, and watercraft, may include one or more computing devices to assist, inform, entertain, or otherwise provide for interactions with occupants of a vehicle. For instance, an automobile may include a vehicle head unit that includes combination of hardware and software, such as a touchscreen display and one or more applications. The vehicle head unit may provide one or more user interfaces that allow a user to interact with the vehicle head unit. As an example, the vehicle head unit may output a user interface for a navigation application that allows a user to specify a destination and provide navigation instructions to the destination. Some vehicle head units may permit a particular user to log into the vehicle head unit for improved personalization. However, some vehicles may include multiple occupants. As such, although multiple occupants may share access to the vehicle head unit, only a particular user logged into the vehicle head unit may benefit from a personalized experience.

SUMMARY

This disclosure is directed to techniques for authenticating multiple users with a vehicle head unit and storing data generated by the vehicle head unit during a shared session to multiple user accounts. For instance, the vehicle head unit may be provided in a shared-screen environment of a vehicle that includes multiple occupants, such as a driver and a passenger. Both the driver and the passenger may have direct access to the vehicle head unit to provide user input in the shared-screen environment. In accordance with techniques of the disclosure, each of the driver and the passenger may initially authenticate with the vehicle head unit. The vehicle head unit may establish a shared session that includes user identifier information for both the driver and the passenger. During the shared session, the vehicle head unit may generate data such as location history data, playlist data, and search history data, to name only a few examples. Rather than writing the generated data to only a single user account, the vehicle head unit may write the data to both the driver's user account and the passenger's user account.

Because the vehicle head unit permits multiple users to authenticate and join a shared session, various data generated during the shared session may not be restricted to a single user but may be written by the vehicle head unit to each user account of an authenticated user. As such, data generated by the vehicle head unit during the shared session may later be used to provide contextually relevant information, services, and/or personalization to each of the driver and passenger. In this way, data generated during the shared session, which may be useful for providing contextually relevant information, services, and/or personalization, is not discarded or only stored to one account, but is instead stored by the vehicle head unit to a respective account of each authenticated user. Although described with respect to a vehicle head unit of a vehicle in some examples of this disclosure, the techniques may also be implemented in systems of other shared-screen environments, such as television set-top boxes, video game consoles, or any other system in which multiple users share direct, physical access to the same system to provide user input.

In some examples, a vehicle head unit of a vehicle includes at least one processor; and at least one module operable by the at least one processor to: responsive to authenticating a first user at a vehicle head unit of a vehicle, establish a session with a first user identifier, the first user identifier associated with the first user; responsive to authenticating a second user at the vehicle head unit, associate a second user identifier with the session, the second user identifier associated with the second user, wherein the first and second user identifiers are concurrently associated with the session; generate data while the first and second user identifiers are concurrently associated with the session; and store, based on the first user identifier and the second user identifier, the data to both a first user account associated with the first user identifier and a second user account associated with the second user identifier.

In some examples, a method includes: responsive to authenticating a first user at a vehicle head unit of a vehicle, establishing, by the vehicle head unit, a session with a first user identifier, the first user identifier associated with the first user; responsive to authenticating a second user at the vehicle head unit, associating, by the vehicle head unit, a second user identifier with the session, the second user identifier associated with the second user, wherein the first and second user identifiers are concurrently associated with the session; generating, by the vehicle head unit, data while the first and second user identifiers are concurrently associated with the session; and store, by the vehicle head unit and based on the first user identifier and the second user identifier, the data to both a first user account associated with the first user identifier and a second user account associated with the second user identifier.

In some examples, a non-transitory computer-readable storage medium, included in a vehicle head unit, is encoded with instructions that, when executed, cause at least one processor of a computing device to: responsive to authenticating a first user at the vehicle head unit of a vehicle, establish a session with a first user identifier, the first user identifier associated with the first user; responsive to authenticating a second user at the vehicle head unit, associate a second user identifier with the session, the second user identifier associated with the second user, wherein the first and second user identifiers are concurrently associated with the session; generate data while the first and second user identifiers are concurrently associated with the session; and store, based on the first user identifier and the second user identifier, the data to both a first user account associated with the first user identifier and a second user account associated with the second user identifier.

In some examples, a method includes, responsive to authenticating a first user at a computing device, establishing, by the computing device, a session with a first user identifier of the first user; responsive to authenticating a second user at the computing device, associating with the session, by the computing device, a second user identifier of the second user, wherein the first and second user identifiers are concurrently associated with the session, wherein the computing device is included in a shared-screen environment that includes each of the first and second users, the computing device being physically accessible by each of the first and second users in the shared-screen environment;

generating, by the computing device, data while the first and second user identifiers are concurrently associated with the session; and storing, by the computing device and based on the first user identifier and the second user identifier, the data to both a first user account associated with the first user identifier and a second user account associated with the second user identifier.

The details of one or more examples are set forth in the accompanying drawings and the description below. Other features, objects, and advantages of the disclosure will be apparent from the description and drawings, and from the claims.

DETAILED DESCRIPTION

Figure 1:
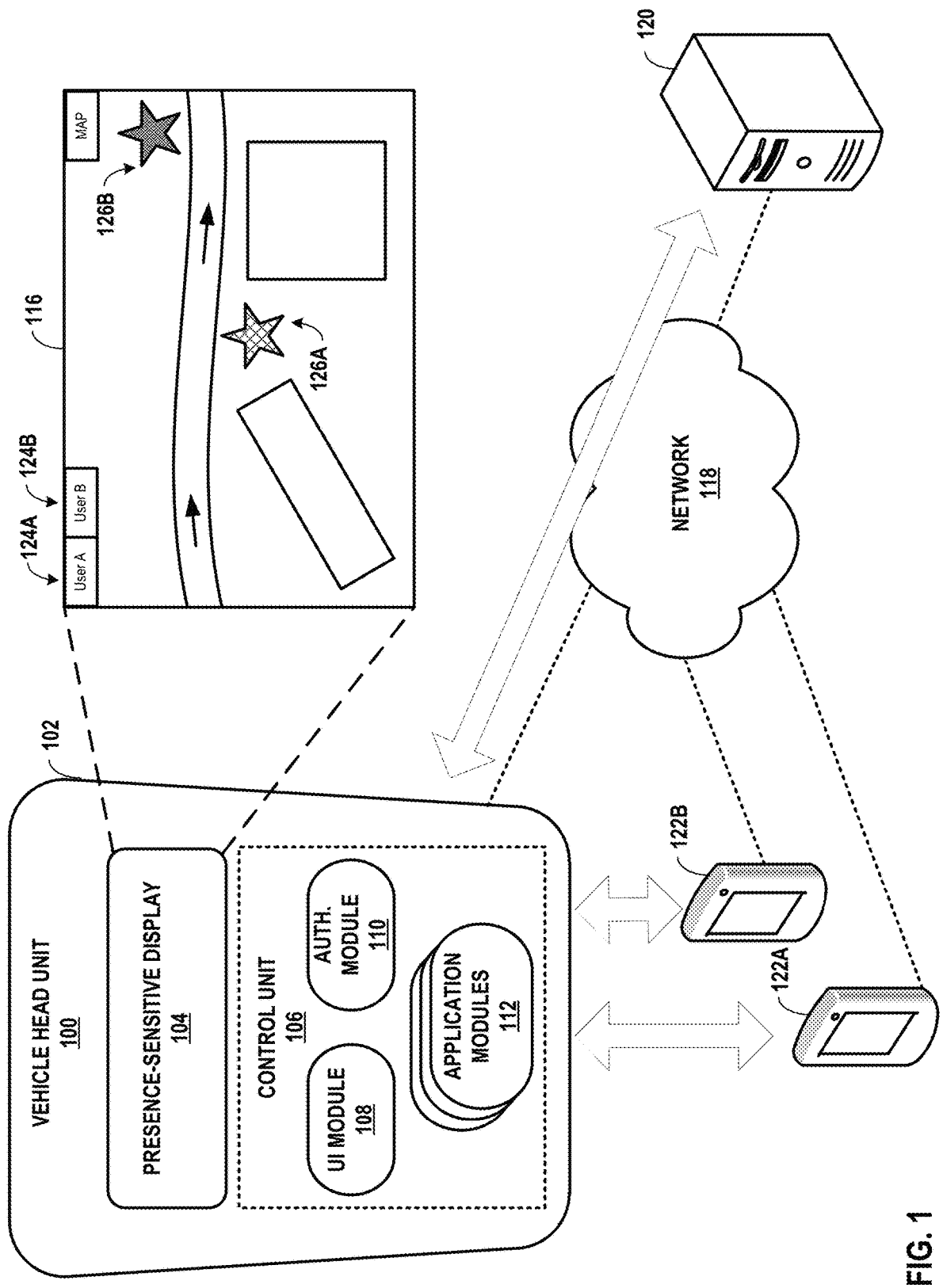
FIG. 1 is a conceptual diagram illustrating a vehicle head unit that stores data to multiple user accounts for multiple users that are included in a session established by vehicle head unit, in accordance with one or more aspects of the present disclosure.

FIG. 1 is a conceptual diagram illustrating a vehicle head unit 100 that stores data to multiple user accounts for multiple users that are included in a session established by vehicle head unit 100, in accordance with one or more aspects of the present disclosure. In some examples, vehicle head unit 100 may be included as part of a vehicle, such as an automobile, motorcycle, aircraft, or watercraft. For instance, vehicle head unit 100 in the example of FIG. 1 is integrated as part of an automobile dashboard or console facing the occupants of the vehicle. Vehicle head unit 100 may be directly and physically accessible to occupants seated in the front driver and front passenger seats of the automobile. The front driver seat of the automobile may be positioned directly behind the steering wheel of the vehicle such that an occupant of the driver seat may physically control the steering wheel. The front passenger seat may be laterally positioned adjacent to the driver seat. In some examples, vehicle head unit 100 may be positioned in the automobile dashboard or console between the driver and passenger seat. For instance, vehicle head unit 100 may be centered between the driver and passenger seat in the automobile dashboard or console.

Vehicle head unit 100 may include, but is not limited to, a housing 102, presence-sensitive display 104, and control unit 106. Housing 102 may in some examples be constructed of plastic, aluminum, steel, or any other suitable material. Housing 102 may be a rigid case that encloses and otherwise protects electrical components that provide the functionality of vehicle head unit 100. In some examples, housing 102 may be affixed, mounted or otherwise integrated with the automobile dashboard or console. As further described in this disclosure, vehicle head unit 100 may include a presence-sensitive display 104 that may output a graphical user interface, such as graphical user interface 116. Vehicle head unit 100 may also include a control unit 106 that provides an operating environment for one or one more modules, such as user-interface (UI) module 108, authentication module 110, and application modules 112. In some examples, control unit 106 may comprise a combination of hardware and software, as further illustrated in FIG. 2. For instance, control unit 106 may include one or more processors and storages devices that may execute instructions and store data of one or more modules. Control unit 106 may also be operably coupled to one or more other software and/or hardware components to control, configure, and/or communicate information with the components, to name only a few example operations.

Vehicle head unit 100 may operate to assist, inform, entertain, or otherwise provide for interactions with occupants of a vehicle. For example, vehicle head unit 100 may include one or more applications 112 that provide functionality to one or more occupants of the vehicle. For instance, vehicle head unit 100 may provide: a navigation service that provides directions to destinations, an information retrieval service that provides information in response to queries and/or as preemptive assistance or recommendations, vehicle data about the vehicle, or multimedia such as audio or video, to name only a few examples. In this way, vehicle head unit 100 may improve the driving or riding experience for one or more occupants of the vehicle.

In some examples, vehicle head unit 100 is operated by one or more users in a shared-screen environment. In some examples of a shared-screen environment, multiple users each have physical access to vehicle head unit 100 and may view output of presence-sensitive display 104 together. Multiple users may also each provide user input directly and physically at presence-sensitive display 104 in a shared screen environment (e.g., may physically touch vehicle head unit 100). In other words, when operated in a shared screen environment, vehicle head unit 100 is physically and directly accessible both multiple users in the same physical setting. For instance, two users in a shared-screen environment with vehicle head unit 100 may not be geographically separated from vehicle head unit 100, such that vehicle head unit 100 is physically inaccessible to one or both of the users. Examples of shared screen environments may include a room of a building, the interior cabin of a vehicle (e.g., a cockpit of an aircraft or a passenger cabin of an automobile), to name only a few examples. A shared-screen system, such as vehicle head unit 100, may be a system in a shared screen environment. A shared-screen system can have multiple users authenticated or logged in simultaneously. In some examples, the primary task for all users may include interacting with a screen of the shared-screen system. For example both the driver and passenger(s) of a vehicle can interact with the vehicle head unit. A shared-screen system may also require or provide for sign-in on the system, and the ability to sign in multiple accounts, corresponding to the different users.

Presence-sensitive display 104 of computing device 200 may function as an input device and as an output device for vehicle head unit 100. In some examples, presence-sensitive display 104 may include an integrated presence-sensitive input device and a display device. For instance, presence-sensitive display 104 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Presence-sensitive display 104 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 200. Further details of presence-sensitive display 104 are included in the description of FIG. 2.

Presence-sensitive display 104 may receive indications of the user input by detecting one or more tap and/or non-tap gestures, continuous gestures, or other any touch gestures (e.g., multi-touch gestures) received by vehicle head unit 100 (e.g., the user touching or pointing to one or more locations of presence-sensitive display 104 with a finger or a stylus pen). Based on indications of user input, a display device of presence-sensitive display 104 may present output to a user. For instance, a display device of presence-sensitive display 104 may present various user interfaces of applications (e.g., a navigation application) executing at vehicle head unit 100. A user of vehicle head unit 100 may provide user input at a presence-sensitive input device of presence-sensitive display 104 to interact with one or more of these applications.

As described above, vehicle head unit 100 may include application modules 108, 110, and 112. Modules 108, 110, and 112 may perform operations described herein using software, hardware, firmware, or a mixture of both hardware, software, and firmware residing in and executing by vehicle head unit 100 or at one or more other remote computing devices. As such, modules 108, 110, and 112 may be implemented as hardware, software, and/or a combination of hardware and software. Vehicle head unit 100 may execute any of modules 108, 110, and 112 as or within a virtual machine executing on underlying hardware. Modules 108, 110, and 112 may be implemented in various ways. For example, any of modules 108, 110, and 112 may be implemented as a downloadable or pre-installed application or "app." In another example, any of modules 108, 110, and 112 may be implemented as part of an operating system of vehicle head unit 100.

As shown in FIG. 1, vehicle head unit 100, in some examples, includes one or more application modules 112. Application modules 112 may include functionality to perform any variety of operations on vehicle head unit 100. For instance, vehicle head unit 100 may include a navigation application, weather application, a phone dialer application, an information retrieval application, a multimedia application, a vehicle information application, an email application, a text messing application, instant messaging application, social networking application, weather application, stock market application, emergency alert application, sports application, to name only a few examples. Although shown as operable by vehicle head unit 100, one or more of application modules 112 may be operable by a remote computing device that is communicatively coupled to vehicle head unit 100. In such examples, an application module executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from a computing device included in vehicle head unit 100. For instance, the remote computing device may be operatively coupled to vehicle head unit 100 by a network. Examples of a remote computing device may include, but is not limited to a server, smartphone, tablet computing device, smart watch, and desktop computer. In some examples, a remote computing device may not be an integrated component of vehicle head unit 100.

In the example of FIG. 1, application modules 112 may include a navigation application. The navigation application may receive an indication of user input from a user that specifies a destination. The navigation application may cause presence-sensitive display 104 to output graphical user interface 116 for display that corresponds to a map. The navigation application may cause graphical user interface 116 to provide one or more directions to the specified destination. For instance, the one or more directions may be displayed by presence-sensitive display 104 as turn-by-turn directions based on the vehicle's current location, a text list of directions, or a high-level map view with a progress indicator to the destination.

As shown in FIG. 1, vehicle head unit 100 may also include user interface (UI) module 108. UI module 108 of vehicle head unit 100 may receive from presence-sensitive display 104, one or more indications of user input detected at presence-sensitive display 104. Generally, each time presence-sensitive display 104 receives an indication of user input detected at a particular location of presence-sensitive display 104, UI module 108 may receive information about the user input from presence-sensitive display 104. UI module 108 may assemble the information received from presence-sensitive display 104 into a set of one or more events, such as a sequence of one or more touch events. Each touch event in the sequence may include data or components that represents parameters (e.g., when, where, originating direction) characterizing a presence and/or movement of input at presence-sensitive display 104. Each touch event in the sequence may include a location component corresponding to a location of presence-sensitive display 104, a time component related to when presence-sensitive display 104 detected user input at the location, and/or an action component related to whether the touch event corresponds to a lift up or a push down at the location.

UI module 108 may determine one or more characteristics of the user input based on the sequence of touch events and include information about these one or more characteristics within each touch event in the sequence of touch events. For example, UI module 108 may determine a start location of the user input, an end location of the user input, a density of a portion of the user input, a speed of a portion of the user input, a direction of a portion of the user input, and a curvature of a portion of the user input. UI module 108 may transmit indications of user input to other modules, such as application modules 112, and/or authentication module 110. UI module 108 may determine one or more single- or multi-touch gestures provided by a user. UI module 108 may also act as an intermediary between various components of vehicle head unit 100 to make determinations based on input detected by presence-sensitive display 104 and generate output presented by presence-sensitive display 104. For instance, UI module 108 may receive data from one or modules 110, and 112 and cause presence-sensitive display 104 to output content, such as graphical use interface 116, for display.

As shown in FIG. 1, vehicle head unit 100 may include an authentication module 110. Authentication module 110 may authenticate one or more users with vehicle head unit 100 to, for example, provide greater personalization with vehicle head unit 100 or to enforce privacy at vehicle head unit 100, to name only a few examples. A user may authenticate with vehicle head unit 100 in a variety of ways. In some examples, authentication module 110 may provide a graphical user interface at presence-sensitive display 104 that allows a user to input a username and password. In some examples, the username may be an identifier of the user.

In other examples, the user may authenticate with vehicle head unit 100 using a computing device associated with the user. For instance, a first user may possess computing device 122A. The first user may be authenticated or otherwise associated with computing device 122A. Accordingly, the first user may use computing device 122A to authenticate with vehicle head unit 100. For instance, computing device 122A may authenticate with vehicle head unit 100 using a wireless or wired communicate channel. Examples may include Universal Serial Bus (USB), Near Field Communication (NFC), Bluetooth, and Wireless Internet Service Provider roaming (WISPr), to name only a few examples.

In some examples, in response to vehicle head unit 100 detecting computing device 122A, authentication module 110 may provide one or more security challenges at presence-sensitive display 104 and/or computing device 122A to authenticate the user. For instance, the security challenge may require the user provide one or more indications of user input that proves the user's identity. Examples of such indications of user input may include but are not limited to: a confirmation, approval, a password, username, physical appearance of user, physiological property of user, device identifier of computing device 122A, hardware token, or software credential. Authentication module 110 may confirm that the one or more indications of user input that proves the user's identity. Authentication module 110 may confirm that the one or more indications of user input prove the user's identity either locally at vehicle head unit 100 and/or may query one or more remote computing devices such as remote computing device 120. If the one or more indications of user input do not prove the user's identity, the user is not authenticated with vehicle head unit 100 until authentication occurs. In some examples, vehicle head unit 100 may authenticate a user by identifying the particular user without requiring the user to provide any credentials or confirmation. Additional techniques for authenticating with vehicle head unit 100 are further described in this disclosure.

In response to authenticating a user, authentication module 110 may establish a session. In some examples, a session may include state information that is stored and managed by authentication module 110. For instance, authentication module 110 may generate a session object corresponding to the session that includes one or more properties and/or operations to store and manage the state information. State information associated with a session may include, but is not limited to: a session identifier, one or more user identifiers that are associated with the session, and expiration information for the session. In some examples, a session may have a defined lifetime after which it expires. A session may expire after a particular period of time or when one or more users exit the session. When the session expires, authentication module 110 may destroy the session object and/or the state information for the session. In some examples, authentication module 110 may store the state information to non-volatile store and then destroy the session object.

Vehicle head unit 100 may use the session information in a variety of ways. For instance, a navigation application included in application modules 112 may use the session information to store location history with one or more user accounts. As an example, while the vehicle driving to a destination, the navigation application may access a user identifier included in the state information and store the location information of the vehicle with a user account corresponding to the user identifier. Accordingly, vehicle head unit 100 and/or remote computing device 120 may use the location history to provide contextually relevant information, services, and/or personalization for the user. As another example, an information retrieval application may access a user identifier included in the state information and store previous queries and or search results with a user account corresponding to the user identifier. More generally, one or more of application modules 112 may use the state information associated with the session to create, read, update, and delete information that is specific to a particular user that has authenticated with vehicle head unit 100.

In accordance with techniques of the disclosure, multiple users may authenticate with vehicle head unit 100. For instance, authentication module 110 may establish a shared session that includes a respective user identifier for each user authenticated with vehicle head unit 100. Rather than writing data generated by vehicle head unit to only a single user account, vehicle head unit 100 may write the to the respective user account of each authenticated user. Because vehicle head unit 100 permits multiple users to authenticate and join the shared session, various data generated during the shared session may not be restricted to a single user but may be written to each user account. As such, data generated by vehicle head unit 100 during the shared session may later be used to provide contextually relevant information, services, and/or personalization to each respective user.

In operation, authentication module 110 may establish a session with a first user identifier of the first user that is associated with computing device 122A in response to authenticating the first user at vehicle head unit 100. A second user associated with computing device 122B may also authenticate with authorization module 110. In response to authenticating the second user, authentication module 110 may associate a second user identifier of the second user with the session. In this way, each of the user and the second user may be concurrently associated with the session. In some examples, graphical user interface 116 may include one or more indicators 124A and 124B that indicate which users and/or how many users are presented authenticated in the shared session with vehicle head unit 100. As further described in this disclosure, by allowing both the first and second users to authenticate with vehicle head unit 100, applications that generate data may use the state information for the session to write data to user accounts of both the first and second users. Although the example of FIG. 1 illustrates techniques of the disclosure with two users, the techniques may be used for any number of two or more users.

Vehicle head unit 100 may generate data while the first and second user identifiers are concurrently associated with the session. For instance, applications 108, 110, and 112 may generate such data while the first and second user identifiers are concurrently associated with the session. In the example of FIG. 1, a navigation application of application modules 112 may generate location history data that corresponds to various locations that the vehicle has travelled to over time. The navigation application may access state information for the shared session that includes the first user identifier and the second user identifier.

The navigation application may store, based on the first user identifier and the second user identifier, the data to both a first user account associated with the first user identifier and a second user account associated with the second user identifier. In some examples, vehicle head unit 100 may store the data by storing the data locally at vehicle head unit 100 and/or by storing the data remotely at a remote computing device, such as remote computing device 120. For instance, vehicle head unit 100 may provide an application programming interface (API) that may be called by applications to store data to a user account. When an application calls the API, vehicle head unit 100 may determine the user identifier for each authenticated user from state information that is maintained by authentication module 110 for the shared session. Based on the set of user identifiers and the data, vehicle head unit 100 may write the data to each user account locally or may send a request to remote computing device 120 via network 118 to store the data, which includes the set of user identifiers and the data. As further described in this disclosure, vehicle head unit 100 may, in some examples, store only a subset of information to one or more user accounts.

In the example of FIG. 1, remote computing device 120 may store information for multiple different user accounts. A user account may include identifying information of the user, such as a name and/or user identifier. Additional data for a user may also be associated with the user account, such as user preferences, location history data, playlist data, and search history data, to name only a few examples. Remote computing device 120 may use the data associated with a user to provide contextually relevant information, services, and/or personalization to the user. For instance, based on the location history information, remote computing device 120 may provide assistance or suggestions to vehicle head unit 100 and/or one or more of computing devices 122A-B that are contextually relevant based on the location of the vehicle. For instance, if remote computing device 120 determines that the first user is a vegetarian, remote computing device 120 may send vehicle head unit 100 a list of vegetarian restaurants that are nearby the location of the vehicle. Presence-sensitive display 104 may output the list of vegetarian restaurants for display.

In some examples, vehicle head unit 100 may output information for display that corresponds to multiple users. For instance, vehicle head unit 100 may receive the data for multiple users from remote computing device 120 and/or one or more of computing device 122A-B. As one example, vehicle head unit 100 may receive data indicating points of interest along a current navigation route, some of which correspond to the first user and some of which correspond to the second user. For example, point of interest 126A may correspond to a first user, while point of interest 126B may correspond to a second user. As further described in this disclosure, vehicle head unit 100 may, in some examples, display only a subset of information to one or more user accounts. Because vehicle head unit 100 is operated in a shared-screen environment with multiple users, the points of interest that are displayed by presence-sensitive display 104 may be relevant to both the first user and the second user. In other words, rather than only displaying information relevant to one of the users, vehicle head unit 100 may display information relevant to both users because multiple users may each authenticate and interact with vehicle head unit 100. As such, techniques of the disclosure implemented at vehicle head unit 100 may provide for improved personalization and/or an improved user experience for multiple occupants, which may not otherwise be available if only a single user were able to authenticate at a time with vehicle head unit 100.

Throughout the disclosure, examples are described where a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 2:
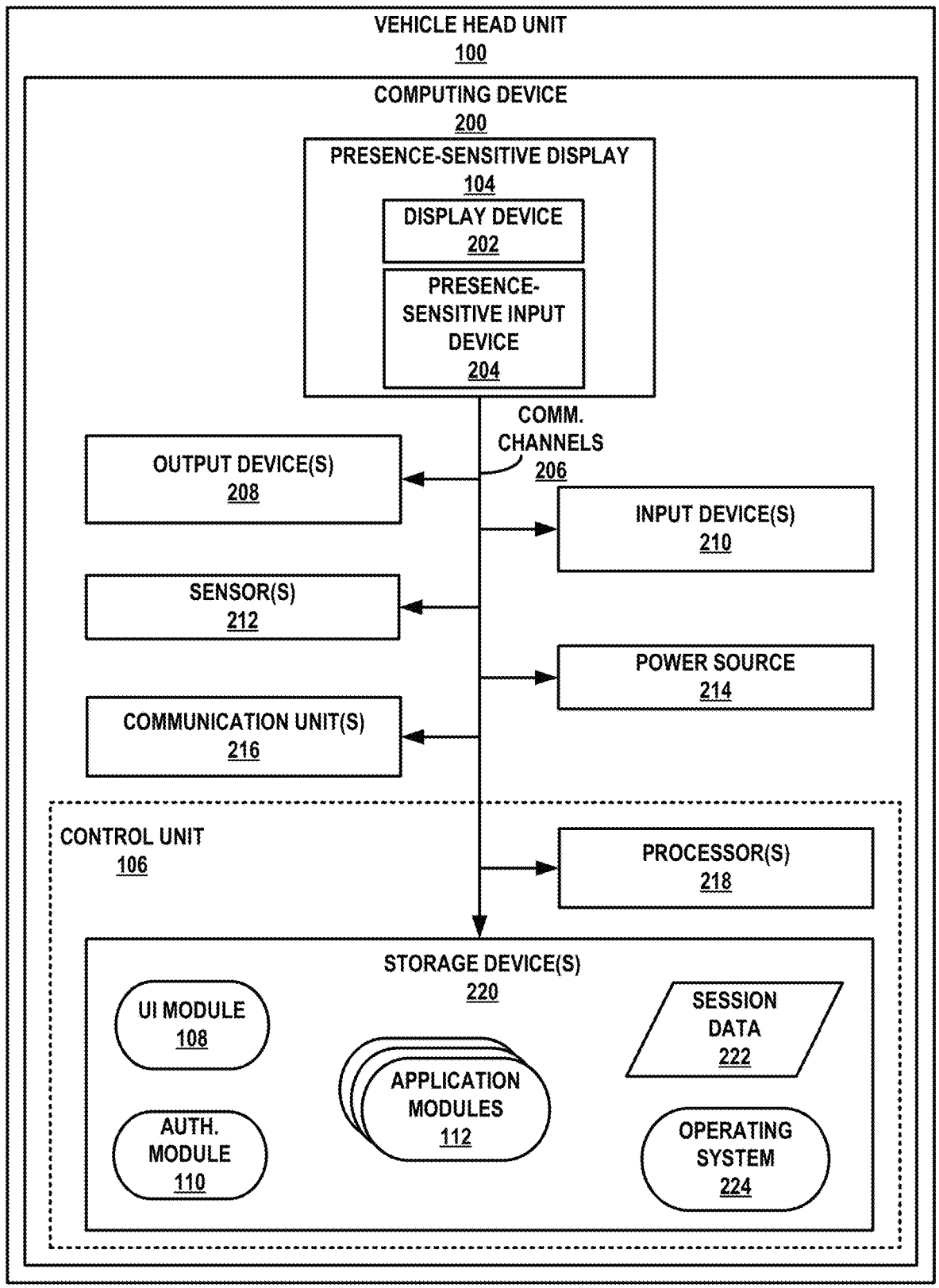
FIG. 2 is a block diagram illustrating an example computing device that implements techniques for storing data to multiple user accounts for multiple users that are included in a session established by a vehicle head unit, in accordance with one or more aspects of the present disclosure.

FIG. 2 is a block diagram illustrating an example computing device 200 that implements techniques for storing data to multiple user accounts for multiple users that are included in a session established by vehicle head unit 100, in accordance with one or more aspects of the present disclosure. Computing device 200 of FIG. 2 is described below within the context of FIG. 1. FIG. 2 illustrates only one particular example of computing device 200, and many other examples of computing device 200 may be used in other instances and may include a subset of the components included in example computing device 200 or may include additional components not shown in FIG. 2. In the example of FIG. 2, vehicle head unit 100 includes computing device 200. For instance, computing device 200 may be affixed, mounted or otherwise integrated with vehicle head unit 100.

As shown in the example of FIG. 2, computing device 200 includes presence-sensitive display 104, one or more output devices 208, one or more input devices 210, one or more sensors 212, a power source 214, one or more communication units 216, and a control unit 106 that include one or more processors 218, and one or more storage devices 220. Storage devices 220 of computing device 200 also include UI module 108, authentication module 110, application modules 112, session data 222, and operating system 224. Communication channels 206 may interconnect one or more of the components 104, 202, 204, 208, 210, 212, 214, 216, 106, 218, 220, 108, 110, 112, 222, and 224 for inter-component communications (physically, communicatively, and/or operatively). In some examples, communication channels 206 may include a system bus, a network connection, one or more inter-process communication data structures, or any other components for communicating data between hardware and/or software.

As shown in FIG. 2, control unit 106 may store and execute the data and instructions of one or more applications, modules or other software. Although FIG. 2 illustrates control unit 106 as including one or more processors 218 and one or more storages device 220, control unit 106 may include more or fewer components than shown in FIG. 2. For instance, control unit 106 may include one or more output devices, input devices, input/output ports or interface, sensors and/or communication units to name only a few examples. In other examples, control unit 106 may only include one or more processors. In any case, control unit 106 may provide an operating environment for one or one more modules, such as user-interface (UI) module 108, authentication module 110, application modules 112, and operating system 224.

One or more processors 218 may implement functionality and/or execute instructions within computing device 200. For example, processors 218 of computing device 200 may receive and execute instructions stored by storage devices 220 that provide the functionality of UI module 108, authentication module 110, application modules 112, and operating system 224. These instructions executed by processors 218 may cause computing device 200 to store and/or modify information, within storage devices 220 during program execution. Processors 218 may execute instructions of UI module 108, authentication module 110, application modules 112, operating system 224, and use data of session data 222 to perform one or more operations. That is, UI module 108, authentication module 110, application modules 112, operating system 224 may be operable by processors 218 to perform various functions described herein.

One or more input devices 210 of computing device 200 may receive input. Examples of input are tactile, audio, kinetic, and optical input, to name only a few examples. Input devices 210 of computing device 200, in one example, include a mouse, keyboard, voice responsive system, video camera, buttons, control pad, microphone or any other type of device for detecting input from a human or machine. In some examples, an input device may be a presence-sensitive input device, which may include a presence-sensitive screen or touch-sensitive screen to name only a few examples.

One or more output devices 208 of computing device 200 may generate output. Examples of output are tactile, audio, and video output. Output devices 208 of computing device 200, in one example, include a presence-sensitive screen, sound card, video graphics adapter card, speaker, cathode ray tube (CRT) monitor, liquid crystal display (LCD), or any other type of device for generating output to a human or machine. Output devices 208 may include display devices such as cathode ray tube (CRT) monitor, liquid crystal display (LCD), Light-Emitting Diode (LED) or any other type of device for generating tactile, audio, and/or visual output.

In some examples, presence-sensitive display 104 of computing device 200 may include functionality of input devices 210 and/or output devices 208. In the example of FIG. 2, presence-sensitive display 104 may include a presence-sensitive input device 204, such as a presence-sensitive screen or touch-sensitive screen. In some examples, presence-sensitive input device 204 may detect an object at and/or near the presence-sensitive input device. As one example range, presence-sensitive input device 204 may detect an object, such as a finger or stylus that is within 2 inches or less of presence-sensitive input device 204. Presence-sensitive input device 204 may determine a location (e.g., an (x,y) coordinate) of the presence-sensitive input device at which the object was detected. In another example range, presence-sensitive input device 204 may detect an object 6 inches or less from presence-sensitive input device 204 and other ranges are also possible. Presence-sensitive input device 204 may determine the location of presence-sensitive input device 204 selected by a user's finger using capacitive, inductive, and/or optical recognition techniques.

In some examples, presence-sensitive display 104 may also provide output to a user using tactile, audio, or video stimuli as described with respect to output devices 208. For instance, presence-sensitive display 104 may include display device 202 that presents a graphical user interface. Display device 202 may be any type of output device that provides visual output, such as described with respect to output devices 208. While illustrated as an integrated component of computing device 200, presence-sensitive display 104 may, in some examples, be an external component that shares a data path with other components of computing device 200 for transmitting and/or receiving input and output. For instance, presence-sensitive display 104 may be a built-in component of computing device 200 located within and physically connected to the external packaging of computing device 200. In another example, presence-sensitive display 104 may be an external component of computing device 200 located outside and physically separated from the packaging of computing device 200 (e.g., a monitor, a projector, etc. that shares a wired and/or wireless data path with a tablet computer). In some examples, presence-sensitive display 104, when located outside of and physically separated from the packaging of computing device 200, may be implemented by two separate components: a presence-sensitive input device 204 for receiving input and a display device 202 for providing output.

One or more communication units 216 of computing device 200 may communicate with external devices by transmitting and/or receiving data. For example, computing device 200 may use communication units 216 to transmit and/or receive radio signals on a radio network such as a cellular radio network. In some examples, communication units 216 may transmit and/or receive satellite signals on a satellite network such as a Global Positioning System (GPS) network. Examples of communication units 216 include a network interface card (e.g. such as an Ethernet card), an optical transceiver, a radio frequency transceiver, a GPS receiver, or any other type of device that can send and/or receive information. Other examples of communication units 216 may include Bluetooth®, GPS, 3G 4G and Wi-Fi® radios found in mobile devices as well as Universal Serial Bus (USB) controllers and the like.

One or more storage devices 220 within computing device 200 may store information for processing during operation of computing device 200. In some examples, one or more of storage devices 220 are temporary memories, meaning that a primary purpose of the one or more storage devices is not long-term storage. Storage devices 220 on computing device 200 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 220, in some examples, also include one or more computer-readable storage media. Storage devices 220 may be configured to store larger amounts of information than volatile memory. Storage devices 220 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 220 may store program instructions and/or data associated with UI module 108, authentication module 110, application modules 112, session data 222, and operating system 224.

As shown in FIG. 2, computing device 200 may include one or more sensors 212. Sensors 212 may include an accelerometer that generates accelerometer data. Accelerometer data may indicate an acceleration and/or a change in acceleration of computing device 200. Sensors 212 may include a gyrometer that generates gyrometer data. Gyrometer data may indicate a physical orientation and/or change in physical orientation of computing device 200. In some examples, the orientation may be relative to one or more reference points. Sensors 212 may include a magnetometer that generates magnetometer data. Magnetometer data may indicate the magnetization of an object that is touching or in proximity to computing device 200. Magnetometer data may indicate the Earth's magnetic field, and in some examples, provide directional functionality of a compass. Sensors 212 may include an ambient light sensor that generates ambient light data. The ambient light data may indicate an intensity of light to which computing device 200 is exposed. Sensors 212 may include a proximity sensor that generates proximity data. Proximity data may indicate whether an object is within proximity to computing device 56. In some examples, proximity data may indicate how close an object is to computing device 200. In some examples, sensors 212 may include a clock that generates a date and time. The date and time may be a current date and time. Sensors 212 may include temperature sensor that measures ambient temperature in proximity to sensors 212. The ambient temperature may indicate an intensity of temperature.

As shown in FIG. 2, computing device 200 may include a power source 214. In some examples, power source 214 may be a battery. Power source 214 may provide power to one or more components of computing device 200. Examples of power source 214 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 214 may have a limited capacity (e.g., 1000-3000 mAh).

In accordance with techniques of the disclosure, a first user may authenticate with computing device 200. For instance, authentication module 110, in conjunction with one or more or communication units 216, may detect that first computing device 122A of the first user is in proximity to computing device 200. Accordingly, authentication module 110 may cause the first user to receive one or more authentication challenges (or in some examples, no challenge) at one or more of presence-sensitive display 104 and/or first computing device 122A. Presence-sensitive display 104 may receive, as user input, one or more credentials or authorizations in response to the challenge in order to authenticate with computing device 200.

Authentication module 110, upon authenticating the first user, may establish a session with a first user identifier associated with the first user. For instance, when authenticating with authentication module 110, the first user and/or the first computing device may provide computing device 200 with the first user identifier. The first user identifier may be associated with a first user account associated with the first user. In some examples, data associated with the first user account may be stored at one or more of computing device 200, the first computing device of the user, and/or a remote computing device. As described in this disclosure the session may include state information (or session data 222) associated with the session, such as the first user identifier.

A second user may also authenticate at computing device 200. For instance, authentication module 110 may detect that second computing device 122B of the second user is in proximity to computing device 200. Accordingly, authentication module 110 may cause the second user to receive one or more authentication challenges (or in some examples, no challenge) at one or more of presence-sensitive display 104 and/or first computing device 122A. For instance, second computing device 122B may present a challenge to the user, based on communication with authentication module 110, and receive, as user input, one or more credentials or authorizations that are sent to authentication module 110 in order to authenticate with computing device 200.

Authentication module 110, upon authenticating the second user, may associate a second user identifier of the second user with the session that also includes the first user identifier. In this way, the first and second user identifiers may both be included in or associated with the session. As such, the first and second users may be concurrently authenticated in the session. One or more of authentication modules 112 may generate data while the first and second user identifiers are concurrently associated with the session. For instance, application modules 112 may include a navigation application that generates location history information. The navigation application may store the generated data to both a first user account and a second user account associated with the first user identifier and a second user account associated with a second user identifier. For instance, the navigation application may access session data 222 to determine first and second user identifiers of the first and second respective users, and store the data at a remote computing device that includes user accounts for the first and second users. For instance, one or more of communication units 216 may send one or more requests to the remote computing device that include the generated data and identifiers of the first and second users. In some examples communication units 216 may send the requests to the remote computing device to store the data using a connection between vehicle head unit 100 and the remote computing device, which does not include a computing device of a user in the shared screen environment. In other examples, communication units 216 may send the requests to the remote computing device using a connection between vehicle head unit 100 and the remote computing device, which includes a computing device of a user in the shared screen environment.

In some examples, a user may remove another user from a session that is maintained by vehicle head unit 100. For instance, a user may provide a user input to vehicle head unit 100 that removes another user from the shared session that includes both users. In some examples, vehicle head unit may store metadata to users' accounts in addition to the data generated by vehicle head unit 100 that is stored to the users' accounts. For instance, the metadata may include user identifiers of other users are also in the shared session. As an example, vehicle head unit 100 may store data, such as location history, to first and second users' accounts. Vehicle head unit 100 may store the location history data and the user identifier of the second user to the first user's account. Similarly, vehicle head unit 100 may store the location history data and the user identifier of the first user to the second user's account. More generally, information about other users in the same shared session may be stored a particular user's account as metadata.

As described in this disclosure, techniques of the disclosure allow multiple users to access their data on vehicle head unit 100 at the same time, because the multiple users have authenticated or are otherwise identified as being in the vehicle with vehicle head unit 100 at the same time. Techniques of the disclosure may allow multiple users to authenticate on a system-level with operating system 224, in some examples. In other examples, vehicle head unit 100 may allow multiple users to authenticate on an application-level with one or more particular applications of application modules 112. In some examples, authentication module 110 may interoperate with one or more of application modules 112 to provide in-application integration for improved personalization. For instance, in the example of a navigation application, the navigation application may cause its corresponding graphical user interface to include, for example users Fabian and Dean, the text "Fabian's destinations" and "Dean's destinations" instead of generically showing "Suggested Destinations." As such, the display destinations may be more personalized on a per-user account, thereby providing for easier identification of the destinations.

As described in this disclosure, data from multiple different user accounts may be displayed by presence-sensitive display 104 at the same time or during a session that concurrently includes the multiple users. For instance, a multimedia application of application modules 112 may determine respective playlist information for both a first user and a second user included in a session. Presence-sensitive display 104 may output the playlist information for both the first and second users for display. In some examples, presence-sensitive display 104 may receive user input from the second user to queue music from either or both of the first user and the second user playlists. Although, described with respect to a playlist, such interaction in which a user selects and/or interacts with outputted information of the user or another user in the session may be applied to any shared information outputted by computing device 200. For example, locations and suggested destinations may be determined by computing device 200 from both passenger's account and driver's account (and, in some examples, added to a multi-waypoint route). Computing device 200 may write destinations travelled to the history of both the driver and the passenger, as described in accordance with techniques of this disclosure.

Figure 3:
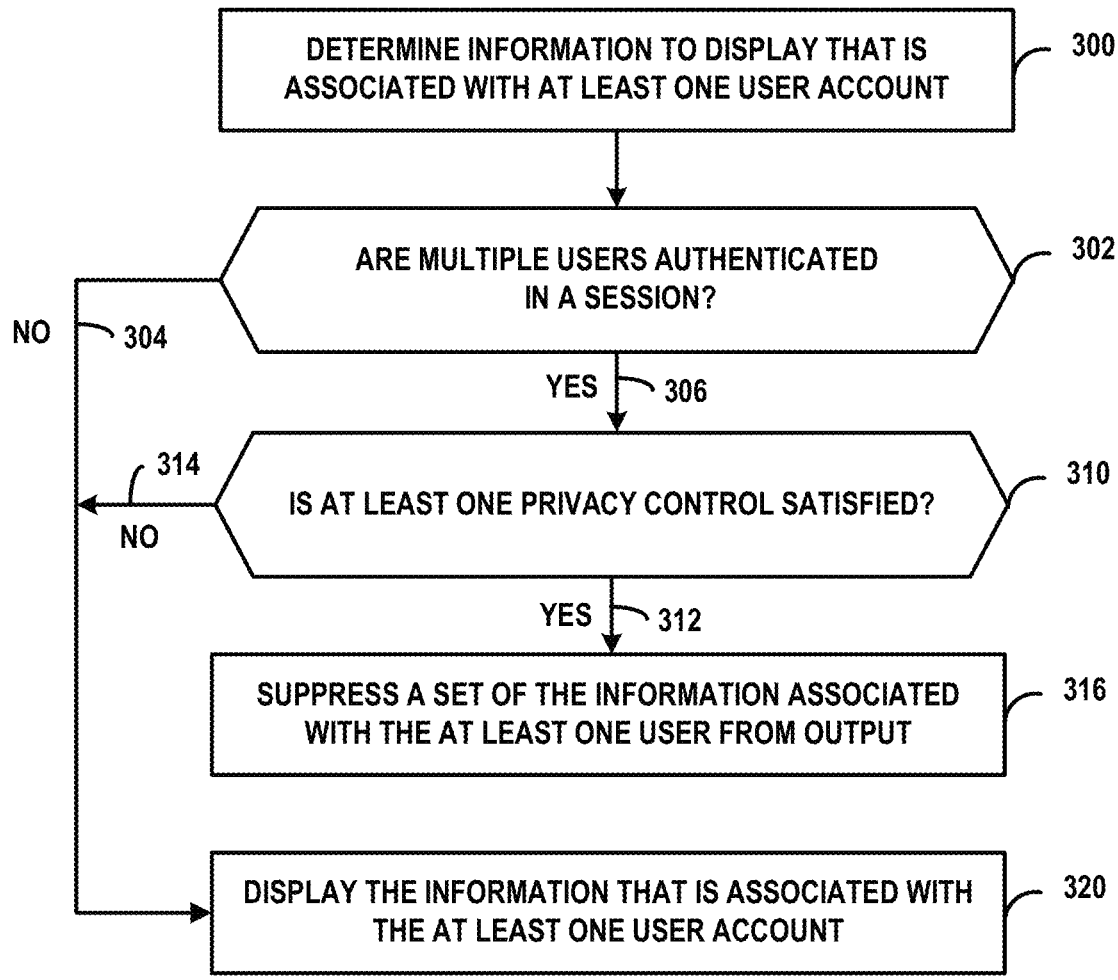
FIG. 3 is a flow diagram illustrating example operations of a computing device that implements techniques for controlling the output of information in a shared-screen environment using privacy controls, in accordance with one or more aspects of the present disclosure.

FIG. 3 is a flow diagram illustrating example operations of a computing device that implements techniques for controlling the output of information in a shared-screen environment using privacy controls, in accordance with one or more aspects of the present disclosure. For purposes of illustration only, the example operations are described below within the context of computing device 200, as shown in FIG. 2. In some examples, one or more of UI module 108, authentication module 110, application modules 112 may perform the techniques of FIG. 3.

As further described in the operations of FIG. 3, because vehicle head unit 100 may be used in a shared-screen environment, privacy controls may be applied by vehicle head unit 100 to prevent the output of private information associated with one or more users and/or the storing of data to one or more user accounts. For instance, a first user may have previously navigated with a vehicle to a jewelry store to purchase an engagement ring. At a later time, the first user authenticated with vehicle head unit 100 may desire that vehicle head unit 100 not output for display the location of the jewelry store in the location history because a second user, who also occupies the same vehicle, may be the future recipient of the engagement ring. As further described in FIG. 3, vehicle head unit 100 may use privacy controls to restrict the display of information at vehicle head unit 100 and/or storing of data to multiple user accounts.

In some examples, a first user and a second user may each authenticate with vehicle head unit 100. As such, vehicle head unit 100 may receive or otherwise determine information to display for at least one of the first and second users (300). For example, in response to authenticating the first user, vehicle head unit 100 may receive location history for the first user from a remote computing device. Vehicle head unit 100 may include a navigation application, which may display in a graphical user interface, information, such as one or more points of interest or previously visited locations based on the location history.

Before displaying the information, vehicle head unit 100 may determine whether multiple users are authenticated in session maintained by vehicle head unit 100 (302). If multiple users are not authenticated in the session (304), for instance, only the first user is authenticated in a session with vehicle head unit 100, then vehicle head unit 100 may output the information associated with the first user for display (320), such as, one or more points of interest or previously visited locations based on the location history. If, however, multiple users are authenticated in a session at vehicle head unit 100 (306), vehicle head unit 100 may determine whether one or more privacy controls are satisfied (308).

In some examples, vehicle head unit 100 may allow an authenticated user to set or define one or more privacy controls that are based on vehicle head unit 100 detecting the presence of an unauthenticated user in proximity to vehicle head unit 100. For instance, vehicle head unit 100 may authenticate a first user and detect that a second user is in proximity to vehicle head unit 100 (e.g., using a weight sensor in a vehicle seat). Vehicle head unit 100 may suppress a set of information associated with the first user from being output for display based on a privacy control that checks whether an unauthenticated user is present in the vehicle with the authenticated user.

In some examples, a privacy control may be represented by a rule, condition, or criterion. The rule, condition, or criterion may specify one or more properties or characteristics of information. Example properties or characteristics may include but are not limited to: creator of the information, sender of the information, recipient of the information, type of information, content of the information, time information was created, time information was sent, and time information was received. Vehicle head unit 100 may determine that a privacy control is satisfied when one or more properties or characteristics of the information match one or more properties or characteristics of the privacy control, or a probability of such a match is greater than a threshold. In some examples, a privacy control may include one or more corresponding actions that vehicle head unit 100 performs when the privacy control is satisfied. For example, an action may include suppressing the display of a set of information, such that the set of information is not output for display. In some examples, the action may include outputting a prompt, before the information is output for display, which allows a user to select whether to output a set of information for display at vehicle head unit 100. In some examples, an action may include outputting a set of information. In some examples, a privacy control may be associated with or specific to a particular user. In some examples, a privacy control may be agnostic to any particular user and instead be associated with or specific to particular information that matches one or more properties or characteristics of the privacy control.

In some examples, if no privacy control is satisfied (314), vehicle head unit 100 may output the information for display (320). For instance, if no privacy controls correspond to the determined information, vehicle head unit 100 may display the information. If vehicle head unit 100 determines that a privacy control is satisfied, vehicle head unit may perform a corresponding action associated with the privacy control. For instance, in the example of FIG. 3, vehicle head unit 100, in response to determining that a privacy control for the location history is satisfied, suppresses the information from being output, such that the location history is not output (316).

In some examples, a user may define a privacy control by interacting with a user interface provided by one or more of vehicle head unit 100, a computing device of the user (e.g., a smartphone, tablet, desktop computer, laptop computer, etc.), or a remote computing device. In some examples the graphical user interface may allow the user to specify one or more properties or characteristics for the privacy control. For instance, a user may specify a type of information (e.g., email, social networking, text message, multimedia, etc.), a particular content of information (e.g., based on category, keyboard, or other input), and/or any other property or characteristic for the privacy control. As an example, first user may want to play some music in a vehicle using vehicle head unit 100, but does not want to make the first user's suggested destinations, calendar events or contacts available for display to a second user in the same vehicle. Using one or more privacy controls for restricted personalization, the first user is able to specify the data they want to share. In this way, such techniques may contribute towards a 'friend of a friend' use case, and could take the form of enabling certain categories of data at login (e.g. Allow Music, disallow Maps), or could take the form of second data to vehicle head unit 100 using one or more wired or wireless protocols. In some examples, the property or characteristics of a privacy control may be based on a social graph of the user defining the privacy control. In some examples, the default action may be to suppress information that matches the one or more properties or characteristics defined by the user for the privacy control. Once the user has defined the privacy control, the user may provide a user input to store and/or implement the privacy control at vehicle head unit 100.

In some examples, a computing device may determine automatically determine one or more privacy controls. For instance, a computing device may define or determine one or more privacy controls based on a dictionary of sensitive words. Vehicle head unit 100 may suppress information that matches one or more of the sensitive words. In some examples, vehicle head unit 100 may suppress output of information for a first user authenticated with vehicle head unit 100 if a second user authenticated with or detected by vehicle head unit 100 is not included in the first user's social graph that is included in a social networking service.

In some examples, vehicle head unit 100 may use one or more privacy controls to prevent data from being stored to one or more user accounts. For instance, a privacy control may cause vehicle head unit 100 to refrain from storing data to one or more users accounts. That is, vehicle head unit 100 may write data for a first user authenticated with vehicle head unit 100 to a first corresponding user account, but may not write data for a second user authenticated at vehicle head unit 100 with the first user to a second user account associated with the second user. As discussed above, a privacy control that causes data to be written to fewer than all user accounts of users authenticated in a session with vehicle head unit 100 may be defined manually by a user or automatically generated by one or more of vehicle head unit 100, a computing device of a user, and/or a remote computing device (e.g., a server). As an example, although a first user may authenticate with vehicle head unit 100, data indicating that the user travelled to jewelry store (e.g., to purchase an engagement ring) may not be stored to a user account of the first user, based on a privacy control. In such examples, while the user is authenticated with vehicle head unit 100, the user may access data already included in his user account, but data (e.g., location history of the jewelry store) is not stored to a user account of the first user.

In some examples, vehicle head unit 100 may store data to one or more user accounts without outputting the data for display, based on one or more privacy controls. For instance, if a first user authenticates with vehicle head unit 100 and travels to a particular location, vehicle head unit 100 may store data to the user account of the first user without outputting for display an indicator (e.g., a name of the location) of the data. As an example, a taxi driver may wish to store the destinations he's travelled to throughout the day, but does not want to share that information with a passenger. The taxi driver may activate this mode or apply such a privacy control to store data to the user account of the first user without outputting for display an indicator when they wish for data to be written to their account, but not visible on the shared screen.

In some shared-screen environments, different users may have different roles. For instance, a driver and passenger may have different roles in a vehicle that includes vehicle head unit 100. The driver may drive the vehicle, while the passenger may not. Vehicle head unit 100 may differentiate between different users that are authenticated with or identified by vehicle head unit 100. Vehicle head unit 100 may differentiate between different users based on one or more criteria. As further described below, vehicle head unit may determine one or more indications for the criteria that indicate at least a role or identity of at least one user in shared-screen environment that includes vehicle head unit 100. Vehicle head unit 100 may compare the one or more indications to a set of one or more criteria to determine the role or identity of the at least one user. Responsive to receiving an indication of user input from the user, vehicle head unit 100 may execute, based at least in part on the role or identity of the at least one user, one or more operations. That is, based on differentiating users, vehicle head unit 100 may determine which user provided a user input, and in some examples, based on differentiating users, vehicle head unit 100 may determine whether or not to perform particular operations with respect to one or more users' data.

Criteria for differentiating between different users may include determining the complexity of a task requested by a user. If the vehicle head unit 100 determines that the complexity of a task satisfies a threshold, vehicle head unit 100 may determine that the user input is from a second user (e.g., a passenger) rather than a first user (e.g., a driver). If the vehicle head unit 100 determines that the complexity of a task does not satisfy a threshold, vehicle head unit 100 may determine that the user input is from the first user (e.g., a driver) rather than the second user (e.g., a passenger). Indications for the complexity may include complexity of the requested task, the complexity of the application performing the task, or the type of application, to name only a few examples.

In some examples, criteria for differentiating between different users may include determining one or more indications of the type of input, such as using voice and/or video recognition (e.g., driver) versus providing touch input (e.g., passenger) to vehicle head unit 100, to identify a particular user. In some examples, criteria for differentiating between different users may include determining which application or type of task the request or user input is directed to. For instance, vehicle head unit 100 may determine that a user request or indication of input for a navigation or phone application may be provided by a first user (e.g., a driver), which is more likely to require the use of such applications for safety reasons than a second user (e.g., a passenger). Criteria for differentiating between users may be determined by triangulating the positions of users' devices in cars using indications such as high frequency audio, the specific key used to unlock or start the car, and/or by a user explicitly indicating her account in the UI. Criteria for differentiating users may be based on one or more indications of the order in which the users authenticate with vehicle head unit 100 (e.g., driver first and passenger second). Vehicle head unit 100 may use any combination of one or more criteria to differentiate between users.

Based on determining that an input has been received from a particular user or that the user has a particular role (e.g., driver vs passenger), vehicle head unit 100 may determine whether or not to perform particular operations. For instance, vehicle head unit 100 may read data from a particular user account based on determining that an input has been received from a particular user, or that the user has a particular role. As an example, if vehicle head unit 100 determines that a driver has provided an indication of user input to call a particular contact in an address book and the request satisfies one or more criteria, vehicle head unit 100 may search and call the particular contact in the address book of the driver, rather than searching or calling a contact in the address book with the same name. In some examples, vehicle head unit 100 may only allow a particular user to perform particular actions or operate particular applications. For instance, vehicle head unit 100 may restrict a phone dialing application to use by the driver only, based on determining which user is the driver.

In another example, vehicle head unit 100 may write data to a particular user account based on determining that an input has been received from a particular user, or that the user has a particular role. As an example, if vehicle head unit 100 receives a user input from a passenger to indicate that she likes or prefers a particular song that is being output and one or more criteria are satisfied, the indication of the passenger's preference may be written only to the passenger's user account. In some examples, vehicle head unit 100 may apply a different and stronger weighting to the passenger's preference for data (e.g., a song or song preference) that is written to the passenger's user account, while also applying a weaker weighting to the data for the driver's user account because the passenger explicitly provided feedback while the driver did not.

Figure 4:
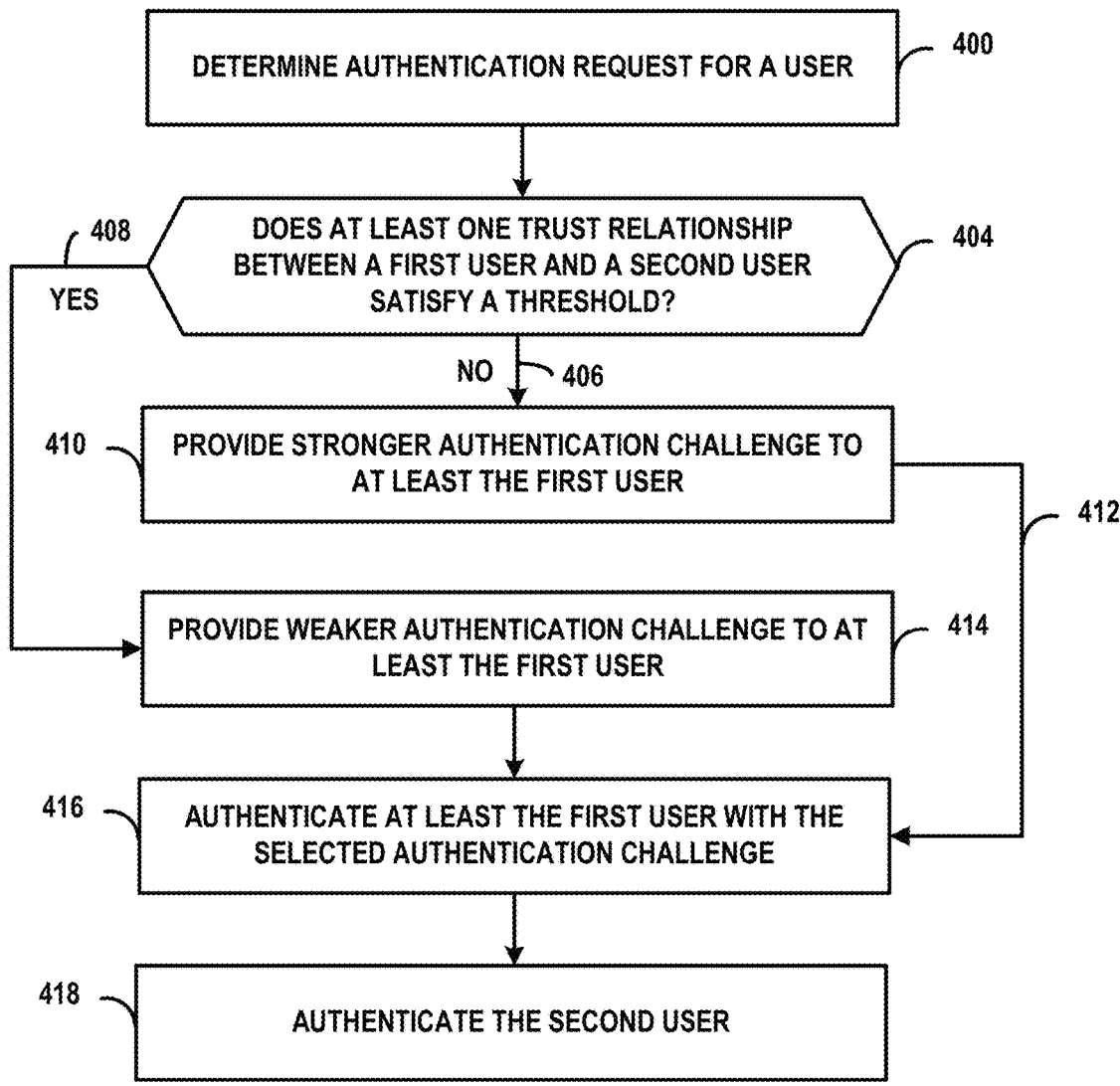
FIG. 4 is a flow diagram illustrating example operations of a computing device that implements techniques for authentication with a vehicle head unit in a shared screen environment, in accordance with one or more aspects of the present disclosure.

FIG. 4 is a flow diagram illustrating example operations of a computing device that implements techniques for authentication with a vehicle head unit in a shared screen environment, in accordance with one or more aspects of the present disclosure. For purposes of illustration only, the example operations are described below within the context of computing device 200 of vehicle head unit 100, as shown in FIG. 2. In some examples, one or more of UI module 108, authentication module 110, application modules 112 may perform the techniques of FIG. 4.

In the example of FIG. 4, vehicle head unit 100 may provide stronger or weaker authentication challenges in a shared-screen environment based on one or more trust relationships between users that authenticate with vehicle head unit 100. If, for example, the degree of trust between users is greater, vehicle head unit 100 may provide a weaker authentication challenge to one or more of the users. By contrast, if the degree of trust is weaker between users, vehicle head unit 100 may provide a stronger authentication challenge to one or more of the users. In some examples, the degree of trust may be defined in a range of degrees (e.g., from weakest to strong degree of trust) by vehicle head unit 100, one or more computing devices associated with one or more users, and/or one or more remote computing devices.

In the example of FIG. 4, vehicle head unit 100 may determine an authentication request or otherwise receive a request for a user to authenticate with vehicle head unit 100 (400). For instance a first computing device associated with a first user may be detected by vehicle head unit 100 as being in proximity to vehicle head unit 100. For instance, the first computing device may be in proximity to vehicle head unit 100 if the first computing device within is a range of the at least one wireless communication channel (in some examples, a short-range wireless communication channel, such as Bluetooth, NFC, etc.) between the first computing device and vehicle head unit 100. Vehicle head unit 100 may detect whether any other users are in proximity to vehicle head unit 100. For instance, vehicle head unit 100 may determine whether a second computing device associated with a second user is in proximity to vehicle head unit 100. If no other users are detected in proximity to vehicle head unit 100, then vehicle head unit 100 may present a weaker security challenge, such as no security challenge at all or a request that the user confirm without any security credential that the user chooses to authenticate with vehicle head unit 100.

If vehicle head unit 100 determines that a second user is in proximity to vehicle head unit 100 and/or is in the shared-screen environment for vehicle head unit 100, then vehicle head unit 100 may determine whether a trust relationship between the first and second users satisfies a threshold (404). In some examples, a trust relationship may be an association between the first user and a second user that indicates a trust level between the first and second user. In some examples, a trust relationship may be stored or defined by vehicle head unit 100 as data in any suitable data structure such as an array, table, graph, or list to name only a few examples. For instance, the trust relationship may indicate one or more users and/or a trust level. In some examples, a user may manually define a trust relationship by providing user input to a computing device, while in other examples, the computing device may automatically generate a trust relationship. For instance, a user may specify one or more other users for a trust relationship and a trust level associated with the trust relationship. In some examples, a computing device (e.g., a computing device included in vehicle head unit 100) may define a trust relationship in response to multiple users authenticating into the computing device simultaneously, for instance, joining a shared session concurrently. In some examples, the trust relationship may be based on degree of separation between users in a social graph of a social network service, wherein a greater degree of separation may indicate a lower trust level.

To determine whether a trust relationship satisfies a threshold, vehicle head unit 100 may determine a trust relationship associated with at least one of the first user and the second user. For instance, vehicle head unit 100 may determine a trust relationship associated with the first user. Vehicle head unit 100 may determine whether the trust level for the trust relationship satisfies a threshold. For instance, if the trust level does not satisfy the threshold (406), vehicle head unit 100 may provide a stronger authentication challenge to the first user or the second user (410). In some examples, vehicle head unit 100 may determine that no trust relationship exists between the first and second users. In such examples, if vehicle head unit 100 determines that no trust relationship exists between the first and second users, vehicle head unit 100 may determine that no trust relationship satisfies a threshold (406), and vehicle head unit 100 may provide a stronger authentication challenge to the first user or the second user (410). If the trust level of the trust relationship associated with the first user satisfies the threshold (408), vehicle head unit 100 may provide a weaker authentication challenge (414). Authentication challenges, ordered from weakest to strongest may include but are not limited to: no challenge, detect device of user (e.g., detect device identifier of device associated with user), user confirmation without any security credentials, face or voice recognition, user pin, username and password combination, and multi-factor authentication, to name only a few examples. As such, in some examples, (e.g., no challenge, or detecting device of user in proximity to vehicle head unit 100), authentication and/or identification of a user may often be automatic.

Based on the authentication challenge, vehicle head unit 100 may authenticate the first user using the selected authentication challenge that is based on the trust relationship (416). Vehicle head unit 100 may then authenticate a second user. In some examples, vehicle head unit 100 may authenticate the second user using an authentication challenge that is of the same strength as the authentication challenge provided to the first user. In other examples, vehicle head unit 100 may authenticate the second user using an authentication challenge that is strong or weaker than the authentication challenge provided to the first user. In some examples, once the first user and second user have authenticated with vehicle head unit 100, then vehicle head unit 100 may store a trust relationship that identifies the first and second users, such that at a later time if the first and second users attempt to authenticate in a concurrent session, vehicle head unit 100 may provide a weaker authentication challenge than the previous (or initial instance) in which the first user and second user authenticated into vehicle head unit 100 to join the same session.

Figure 5:
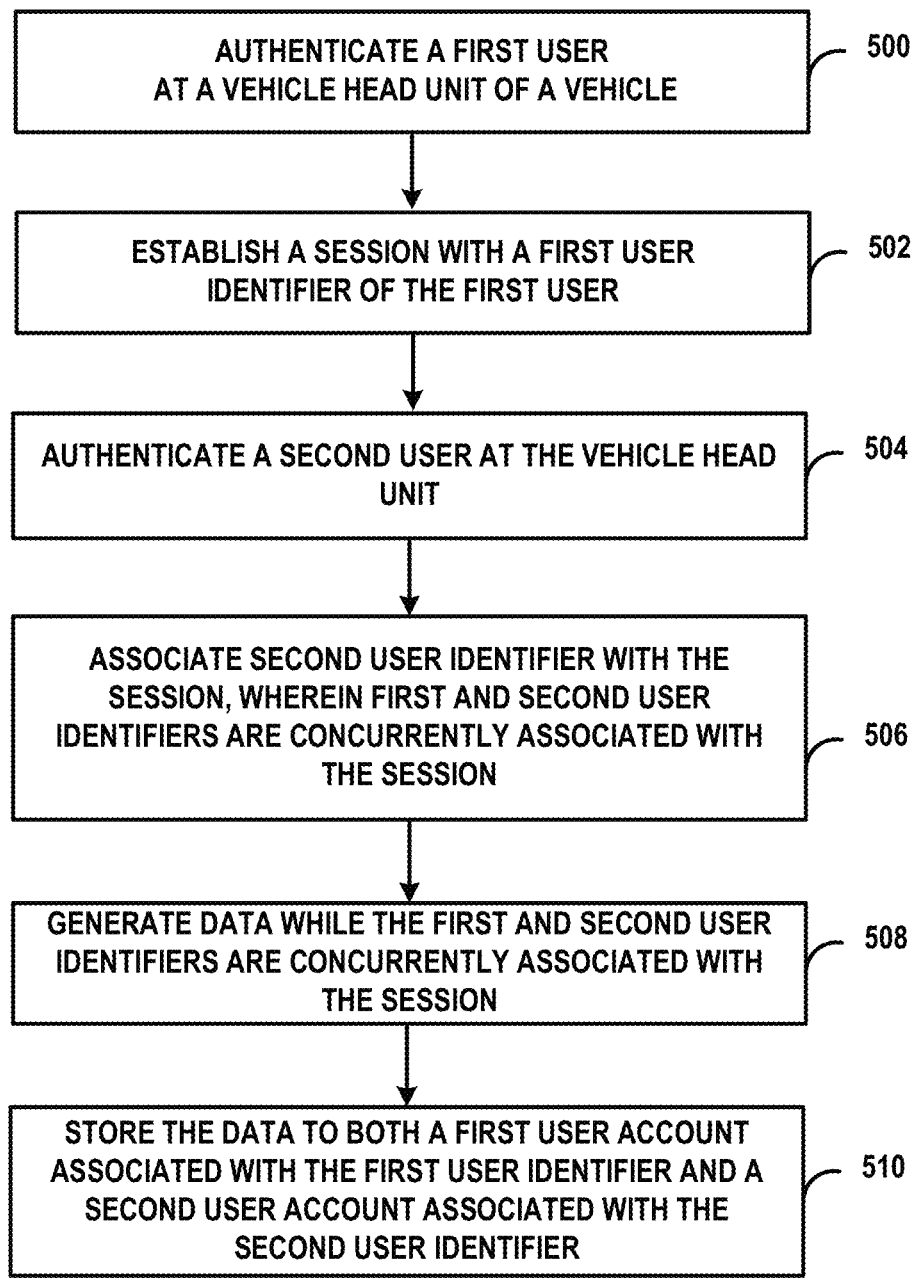
FIG. 5 is a flow diagram illustrating example operations of a computing device that implements techniques for storing data to multiple user accounts for multiple users that are included in a session established by a vehicle head unit, in accordance with one or more aspects of the present disclosure.

FIG. 5 is a flow diagram illustrating example operations of a computing device that implements techniques for storing data to multiple user accounts for multiple users that are included in a session established by vehicle head unit 100, in accordance with one or more aspects of the present disclosure. For purposes of illustration only, the example operations are described below within the context of computing device 200 of vehicle head unit 100, as shown in FIG. 2. In some examples, one or more of UI module 108, authentication module 110, application modules 112 may perform the techniques of FIG. 5.

In the example of FIG. 5, computing device 200 may initially authenticate a first user at vehicle head unit 100 (500). For instance, computing device 200 may detect that a first computing device of the first user is in proximity to computing device 200. Accordingly, the first user may receive one or more authentication challenges (or in some examples, no challenge) at one or more of computing device 200 and/or the first computing device. The user may provide one or more credentials or authorizations in response to the challenge in order to authenticate with computing device 200.

Computing device 200, upon authenticating the first user, may establish a session with a first user identifier associated with the first user (502). For instance, when authenticating with computing device 200, the first user and/or the first computing device may provide computing device 200 with the first user identifier. The first user identifier may be associated with a first user account associated with the first user. In some examples, data associated with the first user account may be stored at one or more of computing device 200, the first computing device of the user, and/or a remote computing device. As described in this disclosure the session may include state information associated with the session, such as the first user identifier.

Computing device 200 may authenticate a second user at vehicle head unit 100 (504). For instance, computing device 200 may detect that a second computing device of the second user is in proximity to computing device 200. Accordingly, the second user may receive one or more authentication challenges (or in some examples, no challenge) at one or more of computing device 200 and/or the second computing device. The second user may provide one or more credentials or authorizations in response to the challenge in order to authenticate with computing device 200.

Computing device 200, upon authenticating the second user, may associate a second user identifier of the second user with the session that also includes the first user identifier (506). In this way, the first and second user identifiers may both be included in or associated with the session. As such, the first and second users may be concurrently authenticated in the session. Computing device 200 may generate data while the first and second user identifiers are concurrently associated with the session (508). For instance, computing device 200 may execute a navigation application that generates location history information. Computing device 200 may store the generated data to both a first user account and a second user account associated with the first user identifier and a second user account associated with a second user identifier (510). For instance, computing device 200 may store the data at a remote computing device that includes user accounts for the first and second users. That is, computing device 200 may send one or more requests to the remote computing device that include the generated data and identifiers of the first and second users.

Figure 6:
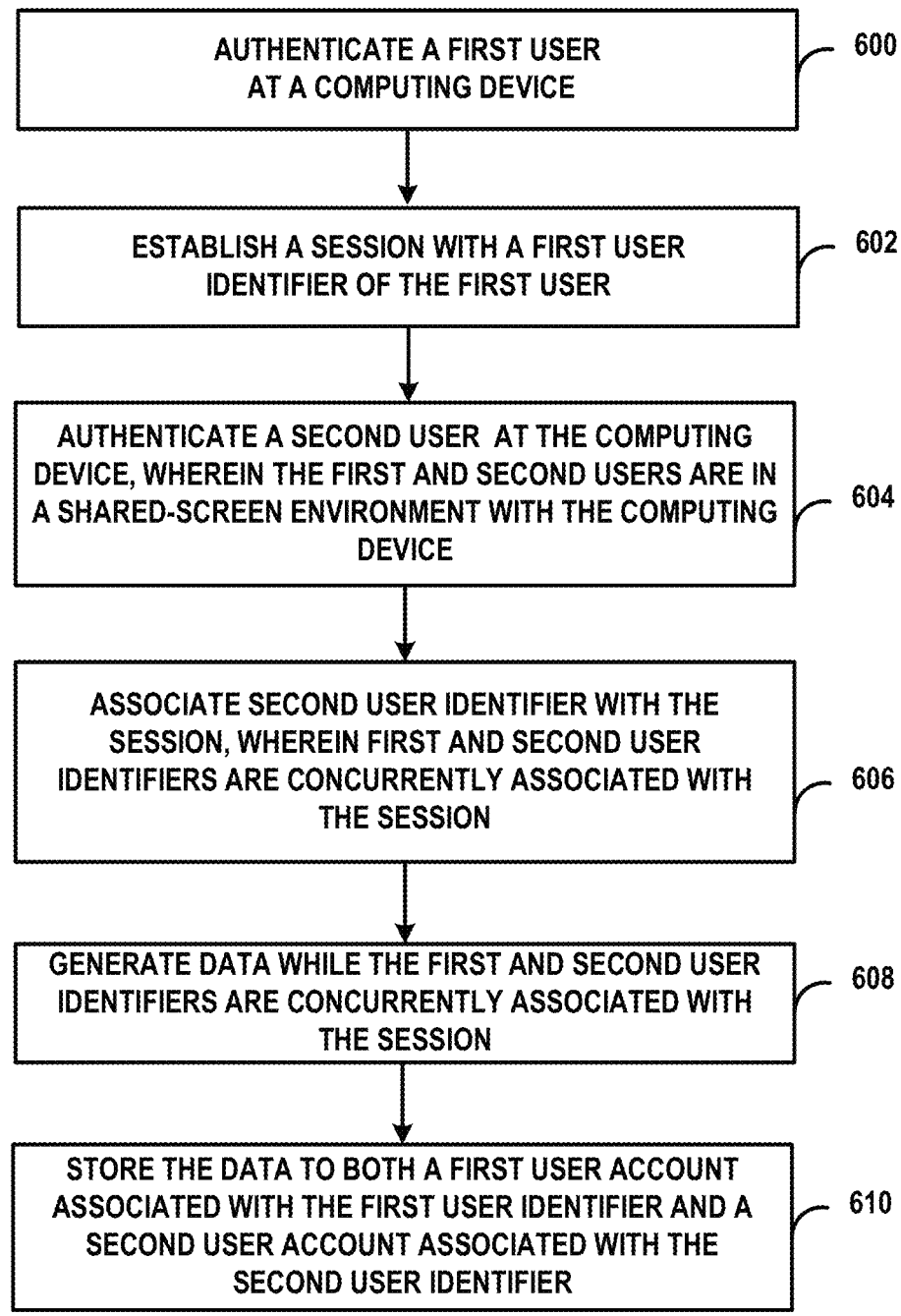
FIG. 6 is a flow diagram illustrating example operations of a computing device that implements techniques for storing data to multiple user accounts for multiple users that are included in a session established by the computing device in a shared-screen environment, in accordance with one or more aspects of the present disclosure.

FIG. 6 is a flow diagram illustrating example operations of a computing device that implements techniques for storing data to multiple user accounts for multiple users that are included in a session established by the computing device in a shared-screen environment, in accordance with one or more aspects of the present disclosure. For purposes of illustration only, the example operations are described below within the context of computing device 200, as shown in FIG. 2. In the example of FIG. 6, computing device 200 may not be included in a vehicle head unit. For instance, computing device 200 may be included in a television set-top box, video game console, or any other system in which multiple users share direct, physical access to the same system. As such, techniques of this disclosure may not be limited to vehicle head units and may be implemented in other computing devices of other shared-screen environments. In some examples, one or more of UI module 108, authentication module 110, application modules 112 may perform the techniques of FIG. 6.

In the example of FIG. 6, a first user may authenticate with computing device 200 (600). For instance, computing device 200 may detect that a first computing device of the first user is in proximity to computing device 200. Accordingly, the first user may receive one or more authentication challenges (or in some examples, no challenge) at one or more of computing device 200 and/or the first computing device. The user may provide one or more credentials or authorizations in response to the challenge in order to authenticate with computing device 200.

Computing device 200, upon authenticating the first user, may establish a session with a first user identifier associated with the first user (602). For instance, when authenticating with computing device 200, the first user and/or the first computing device may provide computing device 200 with the first user identifier. The first user identifier may be associated with a first user account associated with the first user. In some examples, data associated with the first user account may be stored at one or more of computing device 200, the first computing device of the user, and/or a remote computing device. As described in this disclosure the session may include state information associated with the session, such as the first user identifier.

A second user may also authenticate at computing device 200 (604). For instance, computing device 200 may detect that a second computing device of the second user is in proximity to computing device 200. Accordingly, the second user may receive one or more authentication challenges (or in some examples, no challenge) at one or more of computing device 200 and/or the second computing device. The second user may provide one or more credentials or authorizations in response to the challenge in order to authenticate with computing device 200.

Computing device 200, upon authenticating the second user, may associate a second user identifier of the second user with the session that also includes the first user identifier (606). In this way, the first and second user identifiers may both be included in or associated with the session. As such, the first and second users may be concurrently authenticated in the session. Computing device 200 may generate data while the first and second user identifiers are concurrently associated with the session (608). For instance, computing device 200 may execute a navigation application that generates location history information. Computing device 200 may store the generated data to both a first user account and a second user account associated with the first user identifier and a second user account associated with a second user identifier (610). For instance, computing device 200 may store the data at a remote computing device that includes user accounts for the first and second users. That is, computing device 200 may send one or more requests to the remote computing device that include the generated data and identifiers of the first and second users.

As described in this disclosure, in a shared-screen environment (such as the infotainment system in a car, or a TV, or a games console with multiple players), it is often possible to have multiple simultaneous users. In such situations, and when users are signed in, techniques are provided such that a user may not need to make all data/history from their account available to the system. Rather than strictly using a signed-in vs signed-out divide for a single user, in which other non-signed-in users would otherwise lose potential data that could be accumulated during the shared session (which reduces the level of personalization or customization we can offer them later), techniques of this disclosure may solve the single-user sign-in problem by writing data generated in a shared session back to the accounts of all users signed into a session. As such, techniques of the disclosure may not discard data generated the shared session at the end of the session or only associate the data with one strictly with one account, but rather may store the data to multiple user accounts.

When a first user signs into a shared-screen system, the system may read data may read data from the first user's account, and may write data back to the first user's account. In some examples, new suggestions and history may be written back to the first user's account during use in the car, for example, a navigation application builds a better model of common tasks and use cases by the user. In accordance with techniques of the disclosure, when a user signs in, data may also be read from their account too, and any data generated during the session, which includes both the first and second users, will be written to both accounts. For example, the destinations travelled to will be written by the shared-screen system to both the first and second users' accounts, to reflect the fact that they both travelled to those destinations.

In another example implementation, when multiple users are all using the same TV, and are signed in on that TV, the TV program history or video history viewed may be saved to each user's account (and in some examples, regardless of whether a particular user shared her previous data with other users on the system). In some examples, this technique may also be combined with, but can be implemented separately from, an "incognito" technique, by which users could retrieve their previous data, but have no data written by the shared-screen system to their respective user accounts.

Rather than implementing a shared-screen login by only signing in one user per session (which may restrict suggestions and personalization to a single user), techniques of this disclosure may permit multiple users to sign in at a shared-screen system. The techniques of this disclosure may improve finding data, which may often be hard to find exactly because such could have been saved to one of many accounts. For instance, techniques of the disclosure may allow a user to simultaneously login to vehicle head unit 100 using multiple user accounts (e.g., for different services the user is associated with) for that particular user. Techniques of the disclosure may avoid or prevent a situation in a shared-screen environment in which a user is not signed in at all, in which case data generated by vehicle head unit 100 may be tied to a specific device or cannot be used across multiple devices by sync mechanism. In some examples, the additional data written to the users' accounts may provide improved personalization, suggestions, and history, and which can be synchronized to other devices the account is signed in on.

Example 1

A vehicle head unit of a vehicle, the vehicle head unit comprising: at least one processor; and at least one module operable by the at least one processor to: responsive to authenticating a first user at a vehicle head unit of a vehicle, establish a session with a first user identifier, the first user identifier associated with the first user; responsive to authenticating a second user at the vehicle head unit, associate a second user identifier with the session, the second user identifier associated with the second user, wherein the first and second user identifiers are concurrently associated with the session; generate data while the first and second user identifiers are concurrently associated with the session; and store, based on the first user identifier and the second user identifier, the data to both a first user account associated with the first user identifier and a second user account associated with the second user identifier.

Example 2

The vehicle head unit of Example 1, wherein the at least one module is operable by the at least one processor to: determine an authentication request for at least one of the first user or the second user; determine whether a trust relationship between the first user and the second user satisfies a threshold; and if the trust relationship between the first user and the second user satisfies a threshold, provide a first authentication challenge to the at least one of the first user or the second user, and if the trust relationship between the first use and the second user does not satisfy a threshold, provide a second authentication challenge to the at least one of the first user or the second user, wherein the second authentication challenge is stronger than the first authentication challenge.

Example 3

The vehicle head unit of any of Examples 1-2, wherein the at least one module is operable by the at least one processor to: determine information that is associated with at least one of the first user or the second user; responsive to determining that more than one user is authenticated at the vehicle head unit, determine whether a privacy control for the information is satisfied; and if the privacy control is satisfied, suppress at least a set of the information from output for display, and if the privacy control is not satisfied, output the information for display.

Example 4

The vehicle head unit of any of Examples 1-3, wherein the vehicle head unit is included in a shared-screen environment, wherein the at least one module is operable by the at least one processor to: determine one or more indications that indicate at least a role or identity of at least one of the first user or the second user in the shared-screen environment; compare the one or more indications to a set of one or more criteria to determine the role or identity of the at least one of the first user or the second user in the shared-screen environment; and responsive to receiving an indication of user input from the at least one of the first user or the second user in the shared-screen environment, execute, based at least in part on the role or identity of the at least one of the first user or the second user, one or more operations.

Example 5

The vehicle head unit of any of Examples 1-4, wherein the data generated by the vehicle head unit comprises at least one of location history, playlist history, or search history.

Example 6

The vehicle head unit of any of Examples 1-5, wherein the at least one module that is operable by the at least one processor to store the data, is further operable to: generate a request that includes the data, the first user identifier, and the second user identifier; and send the request to at least one remote server to store the data for each of the first user account and the second user account based on the first user identifier and the second user identifier.

Example 7

The vehicle head unit of any of Examples 1-6, wherein the vehicle head unit comprises a presence-sensitive display, wherein the vehicle head unit is included in a shared-screen environment that includes each of the first and second users, and wherein the presence-sensitive display is physically accessible by each of the first and second users in the shared-screen environment.

Example 8

A method comprising: responsive to authenticating a first user at a vehicle head unit of a vehicle, establishing, by the vehicle head unit, a session with a first user identifier, the first user identifier associated with the first user; responsive to authenticating a second user at the vehicle head unit, associating, by the vehicle head unit, a second user identifier with the session, the second user identifier associated with the second user, wherein the first and second user identifiers are concurrently associated with the session; generating, by the vehicle head unit, data while the first and second user identifiers are concurrently associated with the session; and store, by the vehicle head unit and based on the first user identifier and the second user identifier, the data to both a first user account associated with the first user identifier and a second user account associated with the second user identifier.

Example 9

The method of Example 8, further comprising: determining an authentication request for at least one of the first user or the second user; determining whether a trust relationship between the first user and the second user satisfies a threshold; and if the trust relationship between the first user and the second user satisfies a threshold, providing a first authentication challenge to the at least one of the first user or the second user, and if the trust relationship between the first use and the second user does not satisfy a threshold, providing a second authentication challenge to the at least one of the first user or the second user, wherein the second authentication challenge is stronger than the first authentication challenge.

Example 10

The method of any of Examples 8-9, further comprising: determining information that is associated with at least one of the first user or the second user; responsive to determining that more than one user is authenticated at the vehicle head unit, determining whether a privacy control for the information is satisfied; and if the privacy control is satisfied, suppress at least a set of the information from output for display, and if the privacy control is not satisfied, output the information for display.

Example 11

The method of any of Examples 8-10, wherein the vehicle head unit is included in a shared-screen environment, the method further comprising: determining one or more indications that indicate at least a role or identity of at least one of the first user or the second user in the shared-screen environment; comparing the one or more indications to a set of one or more criteria to determine the role or identity of the at least one of the first user or the second user in the shared-screen environment; and responsive to receiving an indication of user input from the at least one of the first user or the second user in the shared-screen environment, executing, based at least in part on the role or identity of the at least one of the first user or the second user, one or more operations.

Example 12

The method of any of Examples 8-11, wherein the data generated by the vehicle head unit comprises at least one of location history, playlist history, or search history.

Example 13

The method of any of Examples 8-12, further comprising: generating a request that includes the data, the first user identifier, and the second user identifier; and sending the request to at least one remote server to store the data for each of the first user account and the second user account based on the first user identifier and the second user identifier.

Example 14

The method of any of Examples 8-13, wherein the vehicle head unit comprises a presence-sensitive display, wherein the vehicle head unit is included in a shared-screen environment that includes each of the first and second users, and wherein the presence-sensitive display is physically accessible by each of the first and second users in the shared-screen environment.

Example 15

A non-transitory computer-readable storage medium, included in a vehicle head unit and encoded with instructions that, when executed, cause at least one processor of a computing device to: responsive to authenticating a first user at the vehicle head unit of a vehicle, establish a session with a first user identifier, the first user identifier associated with the first user; responsive to authenticating a second user at the vehicle head unit, associate a second user identifier with the session, the second user identifier associated with the second user, wherein the first and second user identifiers are concurrently associated with the session; generate data while the first and second user identifiers are concurrently associated with the session; and store, based on the first user identifier and the second user identifier, the data to both a first user account associated with the first user identifier and a second user account associated with the second user identifier.

Example 16

The non-transitory computer-readable storage medium of Example 15 encoded with instructions that, when executed, cause the at least one processor of the computing device to: determine an authentication request for at least one of the first user or the second user; determine whether a trust relationship between the first user and the second user satisfies a threshold; and if the trust relationship between the first user and the second user satisfies a threshold, provide a first authentication challenge to the at least one of the first user or the second user, and if the trust relationship between the first use and the second user does not satisfy a threshold, provide a second authentication challenge to the at least one of the first user or the second user, wherein the second authentication challenge is stronger than the first authentication challenge.

Example 17

The non-transitory computer-readable storage medium of any of Examples 15-16 encoded with instructions that, when executed, cause the at least one processor of the computing device to: determine information that is associated with at least one of the first user or the second user; responsive to determining that more than one user is authenticated at the vehicle head unit, determine whether a privacy control for the information is satisfied; and if the privacy control is satisfied, suppress at least a set of the information from output for display, and if the privacy control is not satisfied, output the information for display.

Example 18

The non-transitory computer-readable storage medium of any of Examples 15-17, wherein the data generated by the vehicle head unit comprises at least one of location history, playlist history, or search history.

Example 19

The non-transitory computer-readable storage medium of any of Examples 15-18, wherein the instructions that, when executed, cause the at least one processor of the computing device to store the data further comprise instructions that, when executed, cause the at least one processor of the computing device to: generate a request that includes the data, the first user identifier, and the second user identifier; and send the request to at least one remote server to store the data for each of the first user account and the second user account based on the first user identifier and the second user identifier.

Example 20

A method comprising: responsive to authenticating a first user at a computing device, establishing, by the computing device, a session with a first user identifier of the first user; responsive to authenticating a second user at the computing device, associating with the session, by the computing device, a second user identifier of the second user, wherein the first and second user identifiers are concurrently associated with the session, wherein the computing device is included in a shared-screen environment that includes each of the first and second users, the computing device being physically accessible by each of the first and second users in the shared-screen environment; generating, by the computing device, data while the first and second user identifiers are concurrently associated with the session; and storing, by the computing device and based on the first user identifier and the second user identifier, the data to both a first user account associated with the first user identifier and a second user account associated with the second user identifier.

Example 21

An apparatus comprising: means for establishing a session with a first user identifier, the first user identifier associated with the first user, responsive to authenticating a first user at the apparatus; means for associating a second user identifier with the session responsive to authenticating a second user at the apparatus, the second user identifier associated with the second user, wherein the first and second user identifiers are concurrently associated with the session; means for generating data while the first and second user identifiers are concurrently associated with the session; and means for storing, based on the first user identifier and the second user identifier, the data to both a first user account associated with the first user identifier and a second user account associated with the second user identifier.

Example 22

The apparatus of Example 21, comprising means for performing the method of any of Examples 9-14.

Example 23

An apparatus comprising: means for establishing a session with a first user identifier of the first user responsive to authenticating a first user at a computing device; means for, associating with the session, a second user identifier of the second user responsive to authenticating a second user at the computing device, wherein the first and second user identifiers are concurrently associated with the session, wherein the apparatus is included in a shared-screen environment that includes each of the first and second users, the apparatus being physically accessible by each of the first and second users in the shared-screen environment; means for generating data while the first and second user identifiers are concurrently associated with the session; and means for storing, based on the first user identifier and the second user identifier, the data to both a first user account associated with the first user identifier and a second user account associated with the second user identifier.

Example 24

The apparatus of Example 23, comprising means for performing the method of any of Examples 9-14.

Example 25

A computing device comprising: at least one processor; and at least one module operable by the at least one processor to: responsive to authenticating a first user at a computing device, establish a session with a first user identifier of the first user; responsive to authenticating a second user at the computing device, associate with the session, a second user identifier of the second user, wherein the first and second user identifiers are concurrently associated with the session, wherein the computing device is included in a shared-screen environment that includes each of the first and second users, the computing device being physically accessible by each of the first and second users in the shared-screen environment; generate data while the first and second user identifiers are concurrently associated with the session; and store, based on the first user identifier and the second user identifier, the data to both a first user account associated with the first user identifier and a second user account associated with the second user identifier.

Example 26

The computing device of Example 25, where the at least one module is operable to perform the method of any of Examples 9-14.

Example 27

A non-transitory computer-readable storage medium, encoded with instructions that, when executed, cause at least one processor of a computing device to: responsive to authenticating a first user at a computing device, establish a session with a first user identifier of the first user; responsive to authenticating a second user at the computing device, associate with the session, a second user identifier of the second user, wherein the first and second user identifiers are concurrently associated with the session, wherein the computing device is included in a shared-screen environment that includes each of the first and second users, the computing device being physically accessible by each of the first and second users in the shared-screen environment; generate data while the first and second user identifiers are concurrently associated with the session; and store, based on the first user identifier and the second user identifier, the data to both a first user account associated with the first user identifier and a second user account associated with the second user identifier.

Example 28

The non-transitory computer-readable storage medium of Example 27, encoded with instructions that, when executed, cause at least one processor of the computing device to, perform the method of any of Examples 9-14.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A vehicle head unit of a vehicle, the vehicle head unit comprising:
   at least one processor; and
   a storage device that stores at least one module operable by the at least one processor to:
   authenticate a first user at the vehicle head unit;
   responsive to authenticating the first user:
     establish a session; and
     associate the session with a user identifier associated with the first user;
   authenticate a second user at the vehicle head unit;
   responsive to authenticating the second user, associate the session with a user identifier associated with the second user, wherein the user identifier associated with the first user and the user identifier associated with the second user are concurrently associated with the session; and
   while the user identifiers associated with the first and second users are concurrently associated with the session, store location information to both a first user account associated with the first user and a second user account associated with the second user, wherein the first user account is different from the second user account.

2. The vehicle head unit of claim 1, wherein the at least one module is operable by the at least one processor to:
   determine, based on the location information and data associated with a user account of the first user, one or more points of interests for the first user;
   determine, based on at least one privacy control, whether to display each of the one or more points of interest for the first user; and
   responsive to determining to display at least a portion of the one or more points of interests for the first user, output, for display, the portion of the one or more points of interests for the first user.

3. The vehicle head unit of claim 2, wherein the at least one module is operable by the at least one processor to:
   determine, based on the location information and data associated with a user account of the second user, one or more points of interests for the second user;
   determine, based on at least one privacy control, whether to display each of the one or more points of interest for the second user; and
   while the portion of the one or more points of interests for the first user are being output for display and responsive to determining not to display the one or more points of interests for the second user, suppress the one or more points of interests for the second user from being output for display.

4. The vehicle head unit of claim 1, wherein the at least one module is operable by the at least one processor to authenticate the second user by at least being operable to:
   determine whether a trust relationship between the first user and the second user satisfies a threshold;
   if the trust relationship satisfies the threshold, provide the first authentication challenge to the second user; and
   if the trust relationship does not satisfy the threshold, provide the second authentication challenge to the second user, wherein the first authentication challenge is weaker than the second authentication challenge.

5. The vehicle head unit of claim 1, wherein the vehicle head unit is included in a shared-screen environment, wherein the at least one module is operable by the at least one processor to:
   determine one or more indications that indicate at least a role or identity of at least one of the first user or the second user in the shared-screen environment;
   compare the one or more indications to a set of one or more criteria to determine the role or identity of the at least one of the first user or the second user in the shared-screen environment; and
   responsive to receiving an indication of user input from the at least one of the first user or the second user in the shared-screen environment, execute, based at least in part on the role or identity of the at least one of the first user or the second user, one or more operations.

6. The vehicle head unit of claim 1, wherein the at least one module is operable by the at least one processor to store at least one of a playlist history of music played while the user identifier associated with the first user and the user identifier associated with the second user are concurrently associated with the session or a search history of searches conducted while the user identifier associated with the first user and the user identifier associated with the second user are concurrently associated with the session.

7. The vehicle head unit of claim 1, wherein the at least one module that is operable by the at least one processor to store the location history by at least being operable to:
generate a request that includes the location history, the user identifier associated with the first user, and the user identifier associated with the second user; and
send the request to at least one remote server to store the location history for each of the first user account and the second user account based on the user identifier associated with the first user, and the user identifier associated with the second user.

8. The vehicle head unit of claim 1, further comprising:
a presence-sensitive display,
wherein the vehicle head unit is included in a shared-screen environment that includes each of the first and second users, and
wherein the presence-sensitive display is physically accessible by each of the first and second users in the shared-screen environment.

9. A method comprising:
responsive to authenticating a first user at a vehicle head unit of a vehicle:
establishing, by the vehicle head unit, a session; and
associating the sessions with a user identifier associated with the first user;
responsive to authenticating a second user at the vehicle head unit, associating, by the vehicle head unit, the session with a user identifier associated with the second user, wherein the user identifier associated with the first user and the user identifier associated with the second user are concurrently associated with the session;
while the user identifiers associated with the first and second users are concurrently associated with the session, storing location information to both a first user account associated with the first user and a second user account associated with the second user, wherein the first user account is different from the second user account.

10. The method of claim 9, further comprising:
determining, by the vehicle head unit and based on the location information and data associated with a user account of the first user, one or more points of interests for the first user;
determining, by the vehicle head unit and based on at least one privacy control, whether to display each of the one or more points of interest for the first user; and
responsive to determining to display at least a portion of the one or more points of interests for the first user, outputting, for display, the portion of the one or more points of interests for the first user.

11. The method of claim 10, further comprising:
determining, based on the location information and data associated with a user account of the second user, one or more points of interests for the second user;
determining, based on at least one privacy control, whether to display each of the one or more points of interest for the second user; and
while the portion of the one or more points of interests for the first user are being output for display and responsive to determining not to display the one or more points of interests for the second user, suppressing the one or more points of interests for the second user from being output for display.

12. The method of claim 9, further comprising:
determining whether a trust relationship between the first user and the second user satisfies a threshold;
if the trust relationship satisfies the threshold, providing the first authentication challenge to the second user; and
if the trust relationship does not satisfy the threshold, providing the second authentication challenge to the second user, wherein the first authentication challenge is weaker than the second authentication challenge.

13. The method of claim 9, wherein the vehicle head unit is included in a shared-screen environment, the method further comprising:
determining one or more indications that indicate at least a role or identity of at least one of the first user or the second user in the shared-screen environment;
comparing the one or more indications to a set of one or more criteria to determine the role or identity of the at least one of the first user or the second user in the shared-screen environment; and
responsive to receiving an indication of user input from the at least one of the first user or the second user in the shared-screen environment, executing, based at least in part on the role or identity of the at least one of the first user or the second user, one or more operations.

14. The method of claim 9, further comprising:
storing at least one of a playlist history of music played while the user identifier associated with the first user and the user identifier associated with the second user are concurrently associated with the session or a search history of searches conducted while the user identifier associated with the first user and the user identifier associated with the second user are concurrently associated with the session.

15. The method of claim 9, further comprising:
generating a request that includes the location history, the user identifier associated with the first user, and the user identifier associated with the second user; and
sending the request to at least one remote server to store the data for each of the first user account and the second user account based on the user identifier associated with the first user and the user identifier associated with the second user.

16. The method of claim 9,
wherein the vehicle head unit comprises a presence-sensitive display,
wherein the vehicle head unit is included in a shared-screen environment that includes each of the first and second users, and
wherein the presence-sensitive display is physically accessible by each of the first and second users in the shared-screen environment.

17. A non-transitory computer-readable storage medium encoded with instructions that, when executed, cause at least one processor of a computing device to:
authenticate a first user at the vehicle head unit;
responsive to authenticating the first user:
establish a session; and
associate the session with a user identifier associated with the first user;
authenticate a second user at the vehicle head unit;
responsive to authenticating the second user, associate the session with a user identifier associated with the second user, wherein the user identifier associated with the first user and the user identifier associated with the second user are concurrently associated with the session;

while the user identifiers associated with the first and second users are concurrently associated with the session, store location information to both a first user account associated with the first user and a second user account associated with the second user, wherein the first user account is different from the second user account.

18. The non-transitory computer-readable storage medium of claim 17, wherein the instructions further cause the one or more processors to:

determine, based on the location information and data associated with a user account of the first user, one or more points of interests for the first user;

determine, based on at least one privacy control, whether to display each of the one or more points of interest for the first user; and responsive to determining to display at least a portion of the one or more points of interests for the first user, output, for display, the portion of the one or more points of interests for the first user.

19. The non-transitory computer-readable storage medium of claim 17, wherein the instructions further cause the one or more processors to:

determine whether a trust relationship between the first user and the second user satisfies a threshold;

if the trust relationship satisfies the threshold, provide the first authentication challenge to the second user; and if the trust relationship does not satisfy the threshold, provide the second authentication challenge to the second user, wherein the first authentication challenge is weaker than the second authentication challenge.

20. The non-transitory computer-readable storage medium of claim 17, wherein the instructions further cause the one or more processors to store at least one of a playlist history of music played while the user identifier associated with the first user and the user identifier associated with the second user are concurrently associated with the session or a search history of searches conducted while the user identifier associated with the first user and the user identifier associated with the second user are concurrently associated with the session.

* * * * *